(12) United States Patent
Cai

(10) Patent No.: US 7,032,507 B2
(45) Date of Patent: *Apr. 25, 2006

(54) DEVICE AND METHOD FOR BREWING COFFEE AND ESPRESSO BEVERAGES

(76) Inventor: Edward Z. Cai, 4607 SE Autumn Ct., Camas, WA (US) 98607

( * ) Notice: Subject to any disclaimer, the term of this patent is extended or adjusted under 35 U.S.C. 154(b) by 163 days.

This patent is subject to a terminal disclaimer.

(21) Appl. No.: 10/631,540

(22) Filed: Jul. 31, 2003

(65) Prior Publication Data

US 2004/0020368 A1  Feb. 5, 2004

Related U.S. Application Data

(63) Continuation-in-part of application No. 09/944,998, filed as application No. PCT/US02/36899 on Nov. 16, 2002, now Pat. No. 6,725,763.

(51) Int. Cl.
*A47J 31/00* (2006.01)

(52) U.S. Cl. .......................... 99/323; 99/323.3; 99/317; 99/322

(58) Field of Classification Search .................. 99/323, 99/317, 321, 322, 295, 323.3; 426/86, 84, 426/77, 112, 433, 435
See application file for complete search history.

(56) References Cited

U.S. PATENT DOCUMENTS

| 2,935,928 | A |   | 5/1960  | Keating et al. |
| 4,134,492 | A |   | 1/1979  | Lucas |
| 4,158,329 | A |   | 6/1979  | McKnight |
| 4,487,114 | A | * | 12/1984 | Abdenour ..................... 99/295 |
| 4,721,835 | A |   | 1/1988  | Welker |
| 4,859,337 | A | * | 8/1989  | Woltermann ................. 210/474 |
| 4,867,993 | A | * | 9/1989  | Nordskog ..................... 426/77 |
| 4,938,375 | A |   | 7/1990  | Fantacone |
| 4,999,109 | A |   | 3/1991  | Sabre |
| 5,135,764 | A |   | 8/1992  | Clausi |
| 5,168,140 | A |   | 12/1992 | Welker |
| 5,243,164 | A | * | 9/1993  | Erickson et al. ............ 219/689 |

(Continued)

FOREIGN PATENT DOCUMENTS

GB        2174890       * 11/1986

*Primary Examiner*—Reginald L. Alexander

(57) ABSTRACT

Device and method for brewing coffee comprises a body connected to a container for allowing the formation of a dispersion of flavor-containing materials and liquid and the extraction of the flavor-containing materials to produce a liquid extraction, a porous filter connected to the body and having a first surface for contacting the dispersion, filtration openings for allowing the liquid extraction in the dispersion to pass through but blocking the flavor-containing materials and a second surface for receiving the liquid extraction, and a flow facilitator having a selective opening adapted to allow air to pass through but restrict the flavor-containing materials from passing through. The body and porous filter are adapted to allow the container to be tilted to generate a liquid head to act on the first surface of porous filter to drive the liquid extraction through the porous filter to produce a beverage. A coffee fine removing means may be incorporated into the device to render coffee beverage free of coffee fines to improving coffee smoothness. The device may further comprise an extraction chamber and an exchange chamber for producing a supply of beverage in the container for drinking or dispensing without any need to tilt the container to generate the liquid head.

58 Claims, 6 Drawing Sheets

U.S. PATENT DOCUMENTS

| | | |
|---|---|---|
| RE34,482 E | 12/1993 | Pastrick |
| 5,267,506 A | 12/1993 | Cai |
| 5,335,591 A | 8/1994 | Pozar |
| 5,358,724 A | 10/1994 | Raffaele |
| 5,635,233 A | 6/1997 | Levinson |
| 5,638,740 A | 6/1997 | Cai |
| 5,806,408 A * | 9/1998 | DeBacker et al. ............ 99/295 |
| 5,932,098 A | 8/1999 | Ross |
| 6,168,816 B1 | 1/2001 | Hammond |
| 6,263,781 B1 | 7/2001 | Calagui |

* cited by examiner

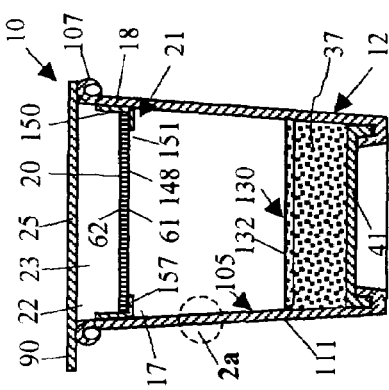
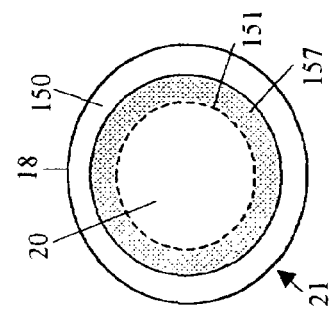
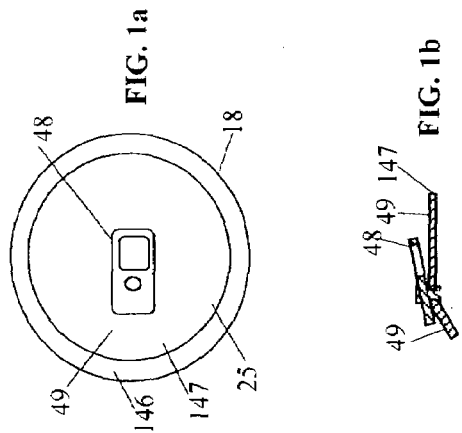
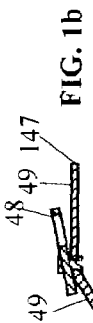
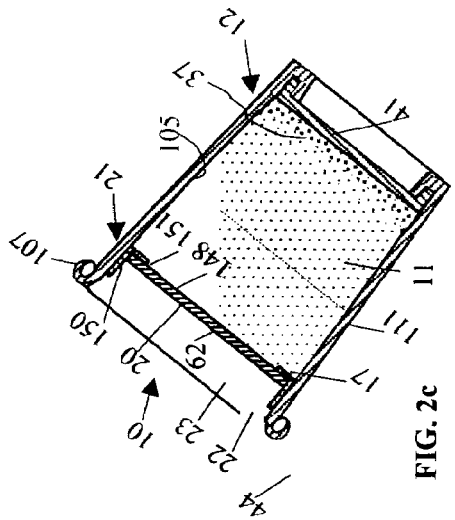
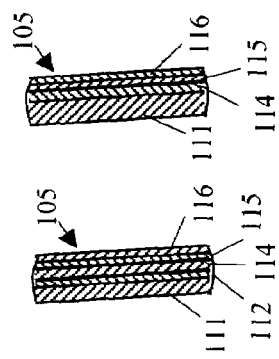
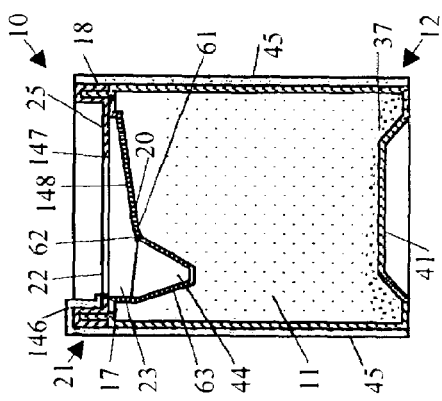

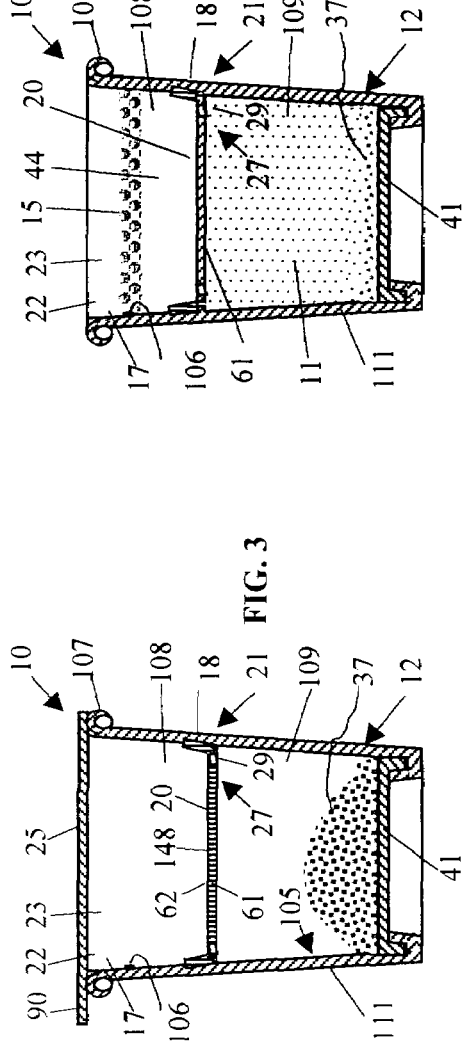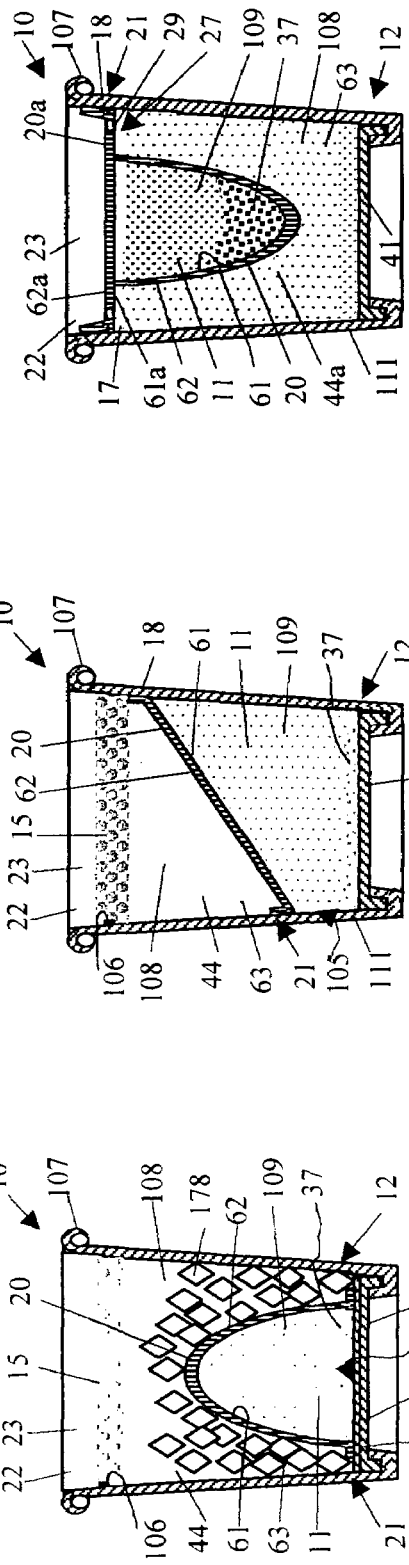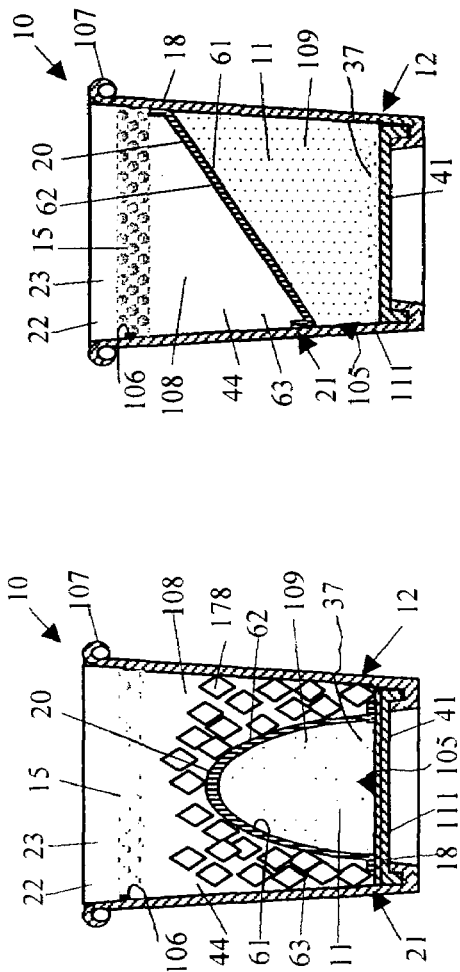

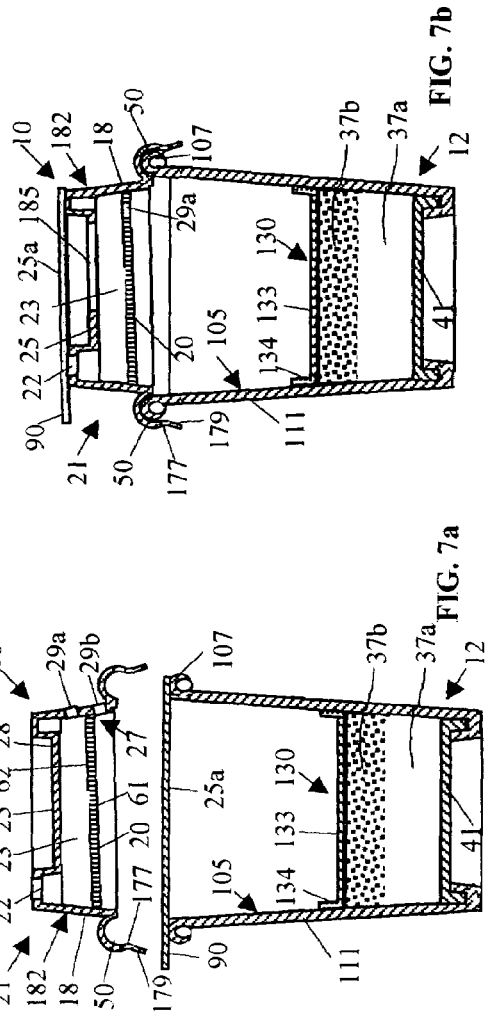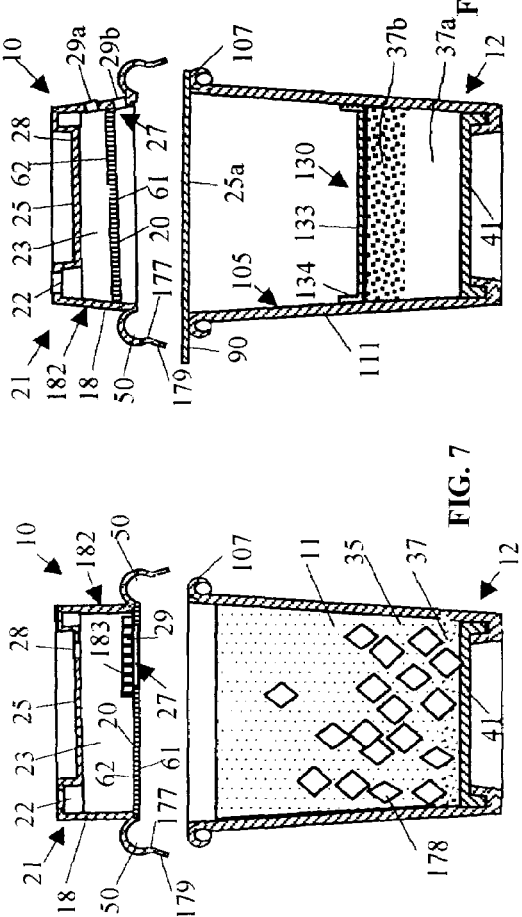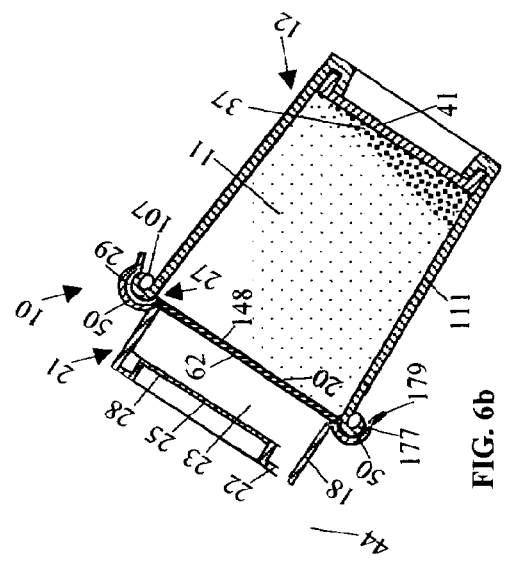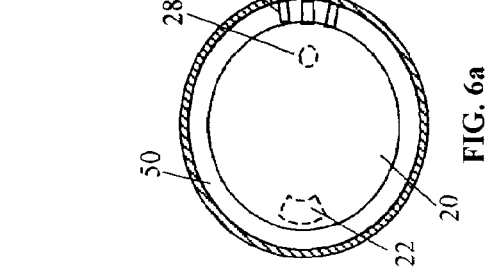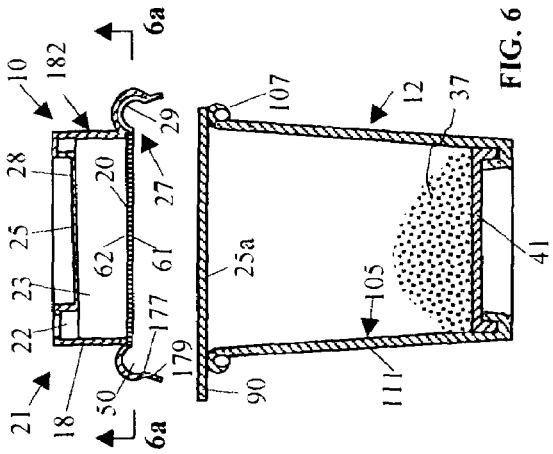

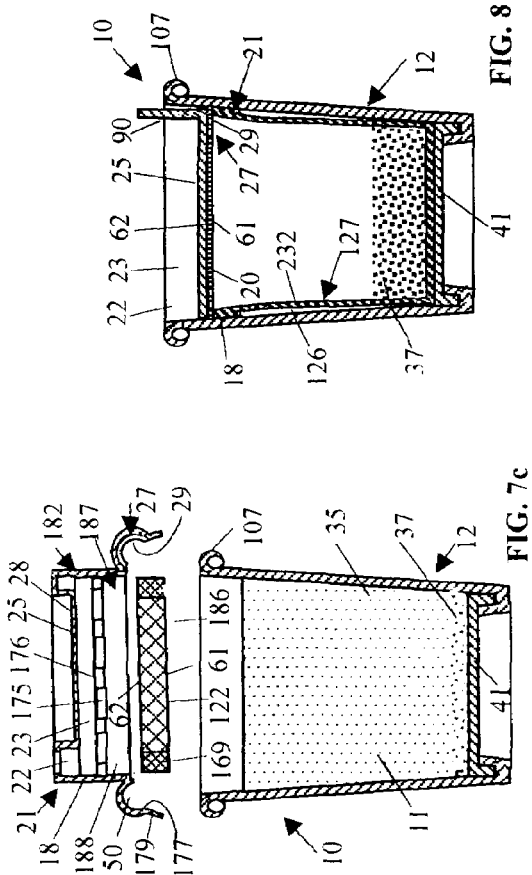
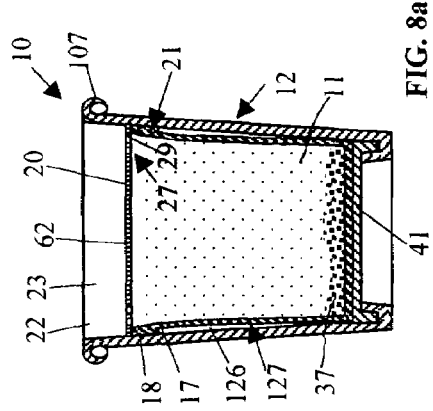
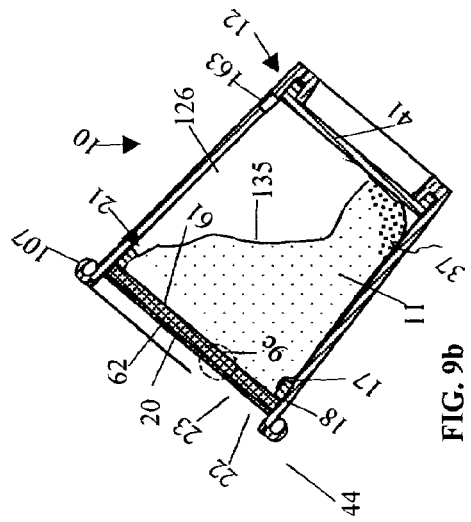
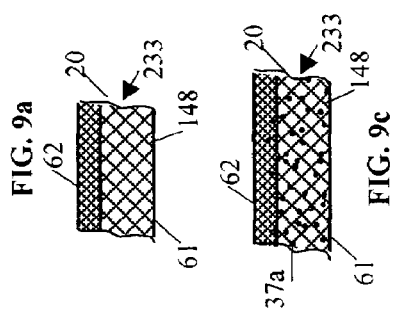
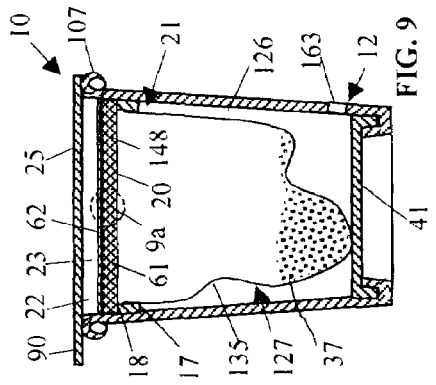

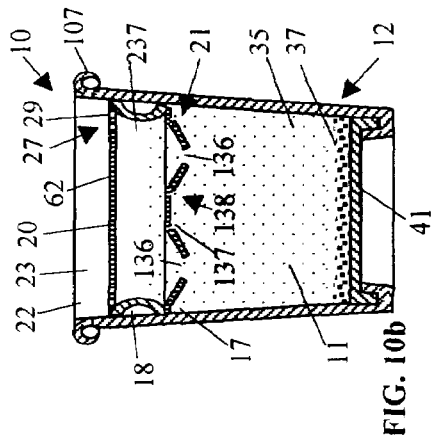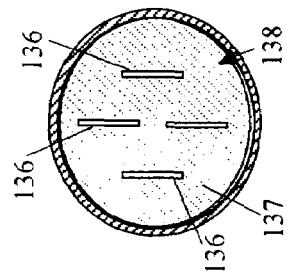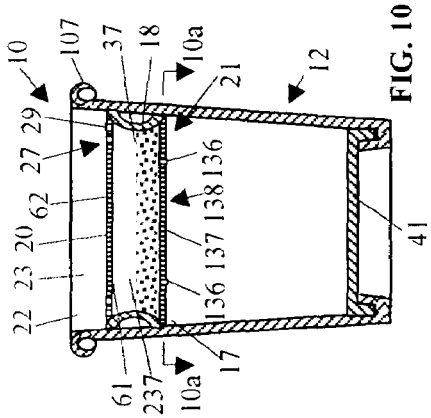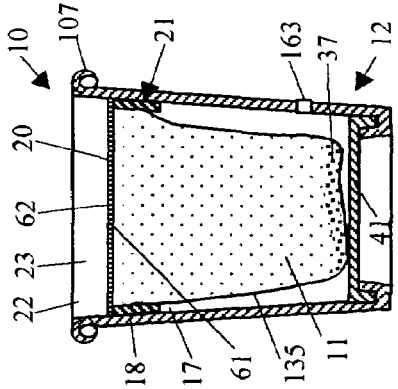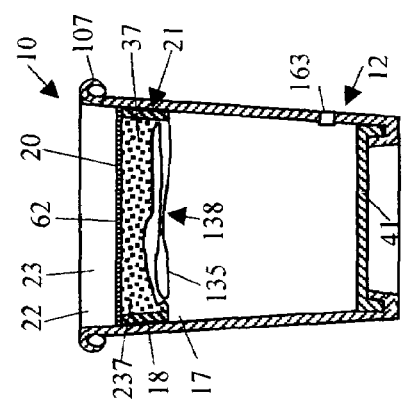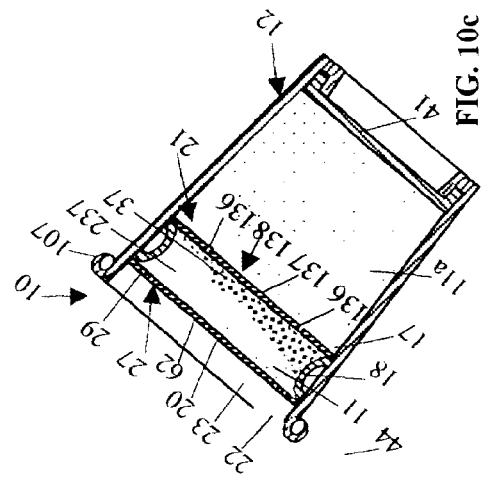

DEVICE AND METHOD FOR BREWING COFFEE AND ESPRESSO BEVERAGES

FIELD OF THE INVENTION

This is a continuation in part application of the application Ser. No. 09/944,998 filed Sep. 1, 2001, now issued as U.S. Pat. No. 6,725,763 B2. and International application number PCT/US02/36899 filed Nov. 16, 2002.

BACKGROUND OF THE INVENTION

Beverages such as coffee and espresso drinks are commonly brewed by causing hot water to pass through the coffee grounds above a disposable or permanent filter either under gravity in case of manual or automatic drip coffee maker or under pressure in case of espresso machines.

Such devices, although popular, have numerous drawbacks such as inconsistent brew quality and lack of the original aroma in the roasted beans. The quality of coffee and espresso brewed varies significantly when coffee grounds of different sizes are used. When grounds is too coarse, the resulting brew is watery; when too fine, the brewing becomes very slow or even stops. The coffee or espresso brewed lacks the aroma or alluring smell of the ground coffee, even when it is made expensive commercial machines in premium coffee shops.

Other drawbacks include bulky size, complicated brewing process, high manufacturing cost, and time-consuming cleaning. Such devices normally take a space over four times larger than the volume of beverage they are designed to brew, which becomes an issue as the countertop or desktop becomes increasingly crowded. The brewing process, especially for espresso machines, involves many steps such as adding grounds to filter, mounting filter, filling water reservoir, heating and pumping water, placing cup or carafe under the basket, is too complex for some people. The manufacturing cost, especially for espresso machines, is very high since numerous components such as heater and pump, reservoir, a brew head, brew basket, basket holder, carafe, housing are required. Finally, such devices require a user to clean many parts such as filter basket, holders, carafe, brew head and cups, which, although not difficult, is a major nuance for many people.

The inventor in U.S. Pat. No. 5,638,740 provided a coffee and espresso device for making better tasting coffee and espresso by transforming the brewed beverage from coffee filter into a high-speed jet. The jet is arranged to inject into the coffee or espresso maintained in a containing means to generate a layer of visually crema in the cup. One issue with this improved device is that it still requires the delivery of liquid through the ground coffee, which increases the complexity, cost and size of the device.

SUMMARY OF THE INVENTION

The invention is an innovative simple device and method for making better beverages from flavor-containing materials. The device comprises a body for connecting to a container adapted to allow the formation of a dispersion of flavor-containing materials in a liquid and the extraction of the flavor-containing materials to produce a beverage, a porous filter connected to the body and having a first surface for contacting the dispersion, a plurality of filtration openings for allowing the beverage in the dispersion to pass through while blocking the flavor-containing materials and a second surface in communication with a beverage outlet from which the beverage may be poured or drunk, and a seal mechanism for securing the body to the container to allow the container to be tilted to generate a liquid head to drive the beverage out of the container through the filtration openings. In a preferable embodiment of the invention, the seal mechanism has a cling-on chamber on the body for forming a vacuum when being pushed into the container and then released to suck to the interior surface of the container. The device may further comprise a blending/mixing mechanism for stirring or breaking the flavor-containing materials and liquid in the container, thereby generating a visually appealing crema or foamy head on the dispersion and/or facilitating extraction of the flavor-containing materials by the liquid therein. The blending/mixing mechanism includes a plate, rod or blade operative either manually or by an electric motor. The device may further comprise a flow facilitator for increasing the flow of the beverage through the filtration openings. The facilitator has a selective opening adapted to allow air to enter the container to prevent the formation of vacuum but prevent or restrict the flavor-containing materials from getting out of the container in the event that the dispersion covers the selective opening under a liquid head or force, thereby ensuring that the beverage out of the container is free of the materials.

It is an object of the present invention to provide a device and method for making better tasting beverage from flavor-containing materials with a visually appealing top crema layer.

It is a further object of the present invention to provide a device and method for grounding, extracting and filtering the flavor-containing materials in the same container to capture all the aroma in the resulting beverage.

It is a further object of the present invention to provide a device and method that are simple, intuitive and has little or even no need to clean after usage.

It is a further object of the present invention to provide the most compact beverage device that is nearly as small as the volume of the beverage it brews at a time.

It is a further object of the present invention to provide a low cost beverage brewing device and a brewing device that can be affordable to be disposed after one use.

These and other objectives and advantages of the present invention will become apparent from the following description of the preferred embodiments, taken together with the accompanying drawings.

DESCRIPTION OF THE DRAWING

The accompanying drawing illustrates diagrammatically non-limitative embodiment of the invention, as follows:

FIG. 1 is a section view of a first embodiment of a brewing device showing coffee made by the device, which is an improved version of the device in FIG. 4 of the parent application Ser. No. 09/944,998, now issued as U.S. Pat. No. 6,725,763 B2;

FIG. 1a is a top view of the brewing device of FIG. 1 prior to making coffee;

FIG. 1b is a sectional view of a section removed from the cover 25 of the device of FIG. 1;

FIG. 2 is a sectional view of a second embodiment of the brewing device, which is an improved version of the device in FIG. 5 of the parent application Ser. No. 09/944,998, now issued as U.S. Pat. No. 6,725,763 B2;

FIG. 2a is an enlarged sectional view for the section of side wall labeled "2a" shown in FIG. 2;

FIG. 2*b* is a sectional view of the brew head assembly 21 prior to being attached to cup 21 of FIG. 2;

FIG. 2*c* is a sectional view for the brewing device of FIG. 2 showing the dispensing of coffee made by the device;

FIG. 3 is a sectional view of a third embodiment of the brewing device;

FIG. 3*a* is a sectional view for the device of FIG. 3 showing the coffee having a natural crema layer made by the device.

FIG. 4 is a sectional view of a forth embodiment of the brewing device showing an iced latte made by the device;

FIG. 4*a* is a top view of a fifth embodiment of the brewing device showing a latte made by the device;

FIG. 4*b* is a top view of a sixth embodiment of the brewing device showing coffee made by the device;

FIG. 6 is a sectional view of a ninth embodiment of the brewing device, which is an improved version of the device in FIG. 6b of the parent application Ser. No. 09/944,998, now issued as U.S. Pat. No. 6,725,763 B2;

FIG. 6*a* a sectional view taken along 9*a*—9*a* of FIG. 6;

FIG. 6*b* is a sectional view for the brewing device of FIG. 6 showing the dispensing of coffee made by the device;

FIG. 7 is a sectional view of a tenth embodiment of the brewing device showing an iced coffee made by the device;

FIG. 7*a* is a sectional view of a eleventh embodiment of the brewing device;

FIG. 7*b* is a sectional view of a twelfth embodiment of the brewing device;

FIG. 7*c* is a sectional view of a thirteenth embodiment of the brewing device prior to being assembled;

FIG. 8 is a sectional view of a fourteenth embodiment of the brewing device;

FIG. 8*a* is a sectional view for the brewing device of FIG. 8 after introducing hot water into the device;

FIG. 9 is a sectional view of a fifteenth embodiment of the brewing device;

FIG. 9*a* is a schematic sectional view for a part of the porous filter 122 labeled "9*a*" shown in FIG. 9;

FIG. 9*b* is sectional view for the brewing device of FIG. 9 showing the dispensing of coffee made by the device;

FIG. 9*c* is a schematic sectional view for a part of the porous filter 122 labeled "9*b*" shown in FIG. 9*b*;

FIG. 10 is a sectional view of a sixteenth embodiment of the brewing device;

FIG. 10*a* is a sectional view taken along long 10–10*a* of the brewing device of FIG. 10;

FIG. 10*b* is a sectional view for the brewing device of FIG. 10 after introducing water into the device when the enclosure member 138 is flexible;

FIG. 10*c* is a sectional view for the brewing device of FIG. 10 showing the dispensing of coffee made by the device when the enclosure member 138 is sufficient rigid;

FIG. 11 is a sectional view of a seventeenth embodiment of the brewing device;

FIG. 11*b* is a sectional view for the brewing device of FIG. 11 after introducing water into the device.

DETAILED DESCRIPTION OF THE PREFERRED EMBODIMENTS

Figure 4C:
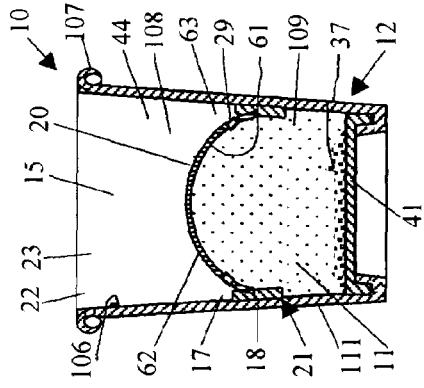
FIG. 4*c* is a sectional view of an eighth embodiment of the brewing device.

FIG. 1 shows an improved version of the brewing device disclosed in the FIG. 4 of the parent application Ser. No. 09/944,998, now issued as U.S. Pat. No. 6,725,763 B2. This improved device 10 comprises an aluminum can 12 having bottom 41 and top end 17, a supply of roasted coffee grounds or other flavor containing materials 37 on the bottom 41 of the can, and a brew head assembly or filter unit 21 having an aluminum body 18, an aluminum cover 25, a porous filter 20 attached at its peripheral edge to the underside of the cover and a transient beverage chamber 23 for collecting the beverage from the porous filter. The body is irremovably or permanently attached to the top end 17 of the container to allow the cover 25 of the body 18 to seal the container and prevent the freshness loss of the flavor-containing materials in the container. The cover 25 (refer to FIGS. 1*a* and 1*b*) comprises a removable section 49 and a lever means 48, which is similar to that in the aluminum cans for soft drinks, located above the breakable section to allow a user to pull the lever to remove the breakable section 49 around a weakened border 147 to form a beverage outlet 22. FIG. 1 shows the brewing device 10 after the breakable section 49 is removed and hot water is added into the container through the beverage outlet 22 and porous filter 20 to extract the flavor-containing materials 37 in the container. The section 49 is made sufficiently large to make beverage outlet 22 sufficiently large to facilitate the addition of hot liquid into the container. The section is made completely removable from the cover to prevent the section, which becomes hot after addition of hot liquid into the container, from burning one's nose when drinking from the outlet 22.

The porous filter comprises a first surface 61 for contacting the flavor-containing materials and liquid extraction in the container, a plurality of filtration openings 148 adapted to allow liquid extraction to pass through as a beverage while block all or substantially all solids and a second surface 62 for receiving the beverage from said filtration openings. A dip-in chamber 63 is formed on the porous filter to cause the filtration of the dispersion 11 of the liquid extraction and flavor-containing materials through the porous filter to produce a reservoir of beverage 44 in the dip-in filtration chamber before the container 12 is tilted, therefore making an supply of beverage 44 quickly available in the can 12. A flow facilitator or a vent, which has be described in much detail the parent application Ser. No. 09/944,998, now issued as U.S. Pat. No. 6,725,763 B2, may be located on the porous filter 20 at a location remote from the beverage outlet 22 to allow air to enter the container when the container is tilted to drink or dispense the beverage but prevent the dispersion and the flavor-containing materials from passing through.

A heat insulation member 45 such as a sleeve or coating made from paper, foam or other insulation materials is connected, either removably or permanently, to the outside of the container 12 to prevent the hot liquid in the container from hurting the user's hand when holding the can. The can may also be made from plastics or plastic-coated paper to reduce heat conduction to hands. A lip protector 146 is attached or coated on the part of the cover 22 and body 18 near the beverage outlet to protect one's lip from being burned by the heat conducted from the hot liquid to the cover when drinking directly from the beverage outlet.

In this and later exemplar embodiments, the container 12 can be made from metal such as stainless steel or aluminum, ceramic or porcelain, glass, paper, plastic foam or plastic materials or any combination of such materials. If the container is intended to contact or in heat-conducting relation with a gas or electric heater for heating the liquid and flavor-containing materials therein, it is preferred to use more heat conductive materials (metal, etc.) as at least the bottom of the container to increase the nucleation centers for steam bubbles thereon, thus reducing or preventing potential overflow of the dispersion 11 when heated. The container can be a carafe, pot, jar, can, bottle, pitcher, thermos, cup or any other vessel that can contain liquid. The porous filter 20 can be a cloth, screen, wire-mesh, woven, non-woven, expanded plastic, etched, punctured or injection molded filter and be made from plastic, metal, glass or elastomer. The liquid can be hot or cold water, milk, alcoholic drinks, soft drinks, fruit juices or any other liquid that can extract flavor or aroma from the flavor-containing materials 37. The flavor-containing materials can be coffee grounds, tea, coca, chocolate powder, milk powder, herb, fruit, meat, vegetables, grains, any combination, or any other materials which contains flavor or aroma. The beverage made by the device can be coffee, espresso, latte, mocha, tea, iced drinks, hot chocolate, blended drinks, fruit juices or any other edible fluids.

To use device 10 of FIG. 1 to make a beverage, one pulls the lever means 48 to remove the section 49 from the cover 25 to make a sufficiently large beverage outlet 20 and pour a desired amount of hot liquid onto the porous filter 20 through the beverage outlet. The hot liquid quickly be filtered into the container 12 through the porous filter and forms a dispersion 11 with the flavor-containing materials 37 in the container. Part of the dispersion 11 is filtered into the dip-in filtration chamber 63 to produce a reservoir of beverage 44 free of the solid flavor-containing materials, therefore making a supply of beverage quickly available for dispensing or drinking. To drink or dispense the beverage, the user simply holds the sleeve 45 and tilts container 12 towards the beverage outlet 22 and the beverage in the dip-in filtration chamber quickly flows out of the beverage outlet. The tilting also generates a liquid head to act on the first surface 61 of the porous filter. The liquid head drives the beverage part of dispersion 11 or the liquid extraction out of the container through the filtration openings of the porous filter 20 to the second surface 62 and out of the beverage out 22.

To make regular coffee or espresso, hot water is added into the container. To make latte or mocha, water/milk or milk alone is added to the container instead of water. Regular hot milk is added to make latte and chocolate-flavored hot milk is added to make mocha. To be close to the conventional latte or mocha made from commercial or home espresso machines, a third volume of hot water may be added into the container 12 first to extract the flavor-containing materials which is roasted coffee grounds here and later two thirds volume of hot or frothed milk is added into the container to mix with the dispersion 11. Latte or mocha can be made and dispensed by simply tilting the container as described above.

The flavor-containing materials may include a certain amount of powdered milk, cocoa and/or chocolate besides the roasted coffee grounds, therefore allowing one to brew mocha or latte by simply adding hot water into the container.

It is appreciated that when the hot liquid is poured onto the porous filter 20, the hot liquid overflow at the beverage outlet presents a safety issue. We found that by using a woven wire or plastic mesh filter which has less than 350 holes per inch, preferably less than 200 holes per inch, such issue may be resolved and the hot liquid can be poured onto the filter at fairly fast without causing overflow. It is also noticed that by pouring the hot liquid onto a fixed spot or small area on the porous filter, the liquid flow through the porous filter into the container actually increases, thus helping preventing the hot liquid overflow issue.

It is also appreciated that the filtration flow through the porous filter increases substantially when the container is tilted to generate the liquid head if one shakes, swirls or repetitively back and forth tilts the container after the liquid is introduced into the container. It is also appreciated that the filtration flow through the porous filter increases further when the container is tilted to generate the liquid head if the container is allowed to rest still after the container has been shaken, swirled or repetitively tilted back and forth. It was also discovered, with a pleasant surprise, that by resting the container for about one minute or more, the amount coffee fines in the beverage from the beverage outlet 22 is significantly reduced. It is theorized that such movement of the container helps the ground coffee in the container, which may float on the liquid after the introduction of liquid, becomes better dispersed in the container, thereby improving the filtration flow.

Figure 5:
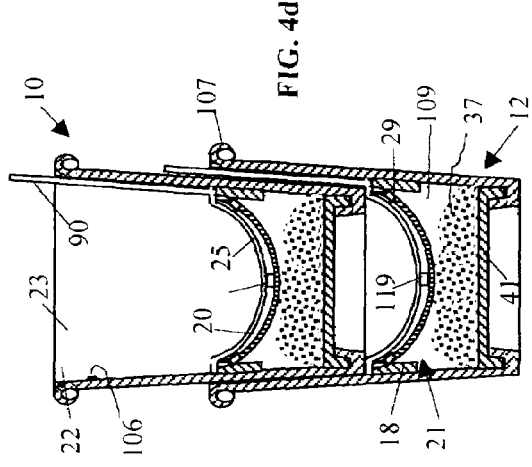
FIG. 5 is a top view of a seventh embodiment of the brewing device showing a coffee made by the device.

FIG. 2 shows an improved version of the brewing device shown in the FIG. 5 of the parent application Ser. No. 09/944,998, now issued as U.S. Pat. No. 6,725,763 B2. This improved device 10 comprises a disposable paper cup as the container 12, a supply of roasted coffee grounds or other flavor containing materials 37 on the bottom 41 of the cup, a brew head assembly 21 attached to the top end 17 of the cup, an inert gas 149 such as nitrogen or carbon dioxide in the container 12, and a cover 25 sealed to the rim 107 of the cup. The flavor containing materials 37 is restricted from movement by a fixer 130 comprising a layer of food-compatible adhesive layer 132 such as starch applied to the surface of the materials 37. The adhesive layer 132 is adapted to be water soluble or breakable to allow the flavor containing materials to move freely to form a dispersion 11 to facilitate the extraction when liquid is introduced into the cup.

A gas-impermeable barrier film 105 (FIG. 2a) is formed on the interior surface for the side wall and bottom 41 of the paper cup 12. This barrier film comprises a barrier layer 114 such as aluminum or metal alloy foil (refer to the left drawing of FIG. 2a) to make the film, thus the cup, impermeable to oxygen and aroma, thereby prevent the loss of aroma and the degradation of coffee grounds by oxygen from outside air. The foil is laminated to the paper cardboard 111, which is to provide the mechanical strength to the cup 12, by an adhesive 112 such as polyacrylic-based materials. A sealant layer 116 is laminated to the foil 114 by an adhesive layer 115. The sealant layer 116 can be polyethylene or other heat-sealable material for protecting the cup from liquid and for facilitating the cup production. It was found that a device 10 without such gas-impermeable barrier film 105 produces weak and stale coffee.

An alternative such gas-impermeable barrier film 105 comprises a barrier layer 114 such as poly(ethyl vinyl alcohol) or EVOH as known in the film industry (refer to the left drawing of FIG. 2a) to make the film, The cover 25 here is made of a flexible gas-impermeable barrier film and has a tab 90 for allowing one to peel off the cover either partially or completely to add liquid into the container to brew beverage. The gas-impermeable flexible cover 25 and the gas-impermeable barrier film 105 forms a gas-impermeable barrier enclosure for the flavor-containing materials 37 in the container 12. It is appreciated that such barrier enclosure can be a chamber made from a gas-impermeable barrier film dimensioned to enclose one or more devices 10 in one such barrier enclosure chamber. The barrier enclosure chamber allows the use of a regular paper or foam cup as the container 12 to achieve a high quality cup of coffee. The brew beverage, the user opens a barrier enclosure chamber and removes a device from the chamber.

The brew head assembly 21 comprises a flexible film as the body 18 to lower the cost for the device 10. The film body 18 has an outer peripheral edge 150 for attaching the body to the interior surface of the gas-impermeable film 105, a large central opening 151, and an inner peripheral edge 157 for attaching the body to the edge of the porous filter 20. The film body 18 may be a polyethylene film to facilitate its attaching to the gas-impermeable film 105 of the cup 12. A strength layer such as a polyester, polypropylene or nylon layer may be laminated to the polyethylene film or co-extruded with a polyethylene film layer to provide mechanical strength to the film body 18.

The method to brew coffee, latte or mocha with the device 10 of FIG. 2 is similar to that with the device 10 of FIG. 1. One peels off the cover film 25 and pour hot water onto the porous filter 20. The hot water filters through the porous filter into the container and dissolves the fixer 130 to form a dispersion with the flavor-containing materials. The container 12 is tilted (FIG. 2c) to allow one to drink or dispense the beverage from the beverage outlet 22. As with the device 10 of FIG. 1, one may swirl or shake the container and let the container rest for a certain amount of time to improve the filtration flow and reduce coffee fines in the beverage.

FIGS. 3–3a and 4–4e show several improved versions of the device of FIG. 2 and a method to brew various beverages with these improved devices. In FIGS. 3 and 3a, the brew head assembly 21 is positioned substantially below the rim 107 of the cup 12 to form a sufficiently deep exchange chamber 108 above the second surface 62 of the porous filter 20 and an extraction chamber 109 below the first surface 61 of the porous filter. The exchange chamber 108 should be sufficiently deep to contain a supply of liquid, which liquid initially contains little or no flavor components from the flavor-containing materials 37 such as coffee grounds after the introduction of liquid into the cup 12. The depth of the exchange chamber can be about a quarter inches to two inches or even deeper depending on the shape and size of the container 12. The extraction chamber 109 encloses the flavor-containing materials 37 and allows a dispersion 11 of the flavor-containing materials and liquid to be formed therein after the introduction of liquid into the cup. The extraction chamber should have a volume significantly larger than the volume of the flavor-containing materials 37 to enable the dispersion 11 to move relatively freely in the extraction chamber when the container is swirled or shaken. It was found that the volume of the extraction chamber should be about two or more times of the volume of the flavor-containing materials 37 in order for the dispersion 11 to move sufficiently freely in the extraction chamber in case of the device 10 of FIG. 3. It is appreciated that numerous factors such as the properties of porous filter 20 and the shape and size of the container 12 will affect the minimum volume and depth required for extraction chamber 109 and exchange chamber 108 for the proper operation of the device.

It is discovered that by swirling or shaking the cup 12, the liquid in the exchange chamber 108 quickly become saturated with the flavor components from the flavor-containing materials 37 in the extraction chamber 109. Therefore, a reservoir of beverage 44 free of coffee grounds is formed in the exchange chamber 108 above the second surface 62 of porous filter 20 ready for drinking or dispensing. It is theorized that the shaking or swirling motion of the container 12 causes the liquid in the exchange chamber 108 to interchange with the liquid extraction in the extraction chamber 109 through the filtration openings 140 of the porous filter 20. As a result, the concentration of the flavor components in the liquid in the exchange chamber 108 increases gradually as the container is being swirled or shaken. It was found that it took about 5 to 60 seconds to make the concentration of the flavor components in the exchange chamber 108 as high as that in the extraction chamber 109. The amount of time needed to equalize the concentrations in the exchange chamber and extraction chamber was found to depend on the thickness, shape and location of the porous filter 20, the size of the filtration openings 148 and the type and amplitude of the motions exerted to the container 12. Besides swirling and shaking, other motions such as vibration and repetitive back & forth tilting also causes effective interchange of the liquid between the exchange chamber 108 and the extraction chamber 109.

It was also discovered that a visually appealing layer of crema 15 (FIG. 3a) is formed on top of the reservoir of beverage 44 in the exchange chamber after the container was swirled or shaken. Such a crema is known to be a sign of good quality coffee made by traditional espresso or coffee machines. It is also discovered that to reduce the amount of time needed to swirl or shake the container, the porous filter 20 between the exchange chamber 8 and extraction chamber 109 is preferred to be sufficiently large and thin with straight-through filtration openings. For example, when a thin wire mesh or a woven cloth with 200 or fewer straight holes per inch is used as the porous filter 20, the amount of swirling time needed to make a reservoir of saturated beverage in the exchange chamber 108 is significantly less than when paper filter is used as the porous filter.

The device 10 of FIG. 3 has a line mark 106 formed or printed on the interior surface of the cup to indicate the right liquid level when one pours liquid into the cup to brew beverage. Here, the brew head assembly 21 comprises a porous filter 20 with its tapered peripheral edge heat sealed or staked to the gas-impermeable barrier film 105 on the side wall of the cup. In this case, the upper part of the side wall of the cup 12 becomes the body 18 for the porous filter. To improve the strength of the heat-sealing to the film 105, the porous filter should be made from or comprises polyethylene or the like polymer that is compatible with the polyethylene sealant layer 116 of the gas-impermeable barrier film 105 to form a strong bond with the sealant layer. A flow facilitator 27 having a plurality of selective openings 29 is located on the porous filter 20 to allow air to pass through from atmosphere into the extraction chamber but to restrict the flavor-containing materials from passing through when the container 20 is tilted to generate a liquid head to act on said first surface 61 of the porous filter to drive the liquid extraction out of the extraction chamber 109 through the filtration openings 148. The selective openings 29 can be equally spaced around the edge of the porous filter so that at least one selective opening is exposed to air on both the first and second surfaces 61 and 62 when the cup 12 is tilted.

To brew beverage, one pours liquid into the container until the liquid level reaches about the line mark 106. The user then swirls or shakes the container 12 and in 5 to 30 seconds a reservoir of beverage 44 with a visually appealing crema layer 15 will be produced in the exchange chamber 108 above the porous filter. The beverage 44 in the exchange chamber 108 may be drunk or poured out by slightly tilting the container 12. When the container is tilted more, a sufficient liquid head will be generated to act on the first surface 61 of the porous filter 20 to drive the liquid extraction in the extraction chamber 109 to the second surface 62 and subsequently to the exchange chamber and the beverage outlet 22.

FIG. 4 shows an alternative to the brewing device of FIG. 3. In this alternative, the porous filter 20 is attached to the bottom 41 of the cup to form the extraction chamber 109 between the first surface 61 of the porous filter and the bottom 41 to enclose a supply of flavor-containing materials 37. The exchange chamber 108 is formed between the second surface 62 of the porous filter and the side wall of the container and comprises a dip-in filtration chamber 63. The dip-in filtration chamber 63 is below the top end of the extraction chamber 109 and as a result the liquid extraction in the extraction chamber will flow from the extraction chamber into the dip-in filtration chamber when hot water is added into the extraction chamber.

A gas-impermeable film cover 25, which has been removed prior to introducing water into the cup to extract the supply of flavor-containing materials 37 in the extraction chamber and is thus not shown in FIG. 4, is attached to the bottom 41 outside the porous filter 20 to form a barrier enclosure for the supply of flavor-containing materials. Here the bottom 41 comprises a gas-impermeable barrier film 105 (please refer to FIG. 2a for its structure) laminated or extrusion-coated on the paper cardboard 111. The side wall of the cup 12 may not need to have any gas-impermeable barrier film 105, therefore lowering the cost for the cup. It is appreciated that the porous filter 20 may be attached to a gas-impermeable plastic sheet or film disc (not shown) to form the extraction chamber 109 to enclose the supply of flavor-containing materials 37. The disc, together with the porous filter and the supply of flavor-containing materials on it, is then attached to the bottom of a low-cost conventional disposable paper cup. It is also appreciated that the porous filter can be made elastic and flexible enough to allow it to be pushed down or compressed towards the bottom 41 of the container by the gas-impermeable cover film 25, thereby allowing several such devices 10 to be stacked into each other for storage. It is also appreciated that the gas-impermeable cover film 25 may be sealed to the impermeable plastic sheet or film disc prior to attaching the assembly to the bottom 41 of the cup. It is also appreciated that the extraction chamber can be made tall to allow a top part of the porous filter to stick out of the liquid surface during brewing.

To make an iced latte with this brewing device, about ⅓ cup hot or boiling water is poured onto and through the porous filter 20 into the extraction chamber 109 to form a dispersion with the roasted coffee grounds in the extraction chamber. Part of the coffee extraction will flow out of the extraction chamber into the dip-in filtration chamber 63 of the exchange chamber. After about 1 minute, ice cube or crushed ice 178 and cold milk are introduced, either simultaneously or separately, into the exchange chamber 108. The container is then swirled or shaken for 5 to 20 seconds to produce a reservoir of iced latte 44 in the exchange chamber 108. To reducing spluttering, a lid may be placed on the cup 12 prior to swirling or shaking the cup 12. Chocolate milk may be used to replace the milk to make iced mocha.

The heat exchange from the ice 178 in the exchange chamber to the dispersion 11 in the extraction chamber quickly quenches or stops further extraction of the flavor-containing materials 37 by water, therefore preventing certain bitter flavors or "bad" chemicals from being extracted out of the flavor-containing materials and improving the taste of the resulting latte.

Unlike the devices 10 of FIGS. 3 and 4, the device of FIG. 4a comprises a porous filter 20 which is formed to be attached to the gas-impermeable barrier film 105 on the side wall of the cup in a sloped position. In this case, most of the side wall of the cup 12 becomes the body 18 for the porous filter 20. The sloped porous filter forms an extraction chamber 109 to enclose a supply of flavor-containing materials 37 and an extraction chamber 108 comprising a dip-in filtration chamber 63 above the second surface 62 of the porous filter. The method of brewing beverage from this device is similar to that from the devices 10 of FIGS. 3 and 4.

In FIG. 4b, there are provided two porous filters 20 and 20a in the brew head assembly 21. The extraction chamber 109 is formed between the first surfaces 61 and 61a of the first and second porous filters 20 and 20a to enclose a supply of flavor-containing materials 37. The second filter 20a is formed around its edge to have a tapered or vertical edge 18 to attach the assembly 21 to the gas-impermeable barrier film 105 on the interior of the cup 12. A plurality of selective openings 29 are formed around the edge of the second porous filter 20a to allow at least one of the selective openings above the liquid surface when the cup is tilted. The first porous filter 20 may have relatively larger filtration openings to reduce flow resistance. Such larger filtration openings allows more coffee fines or even some finer grounds to pass through the first porous filter into the exchange chamber 108 that comprises the dip-in filtration chamber 63, therefore causing more coffee fines and even grounds in the beverage 44a generated in the exchange chamber. The second porous filter 20a may filter the beverage 44a in the exchange chamber to make the beverage coming out of the second surface 62a with substantially reduced coffee fines and substantially free of coffee grounds. It is appreciated that the extraction chamber 108 may be enclosed by the first porous filter 20 alone to enclose the flavor-containing materials.

Figure 4D:
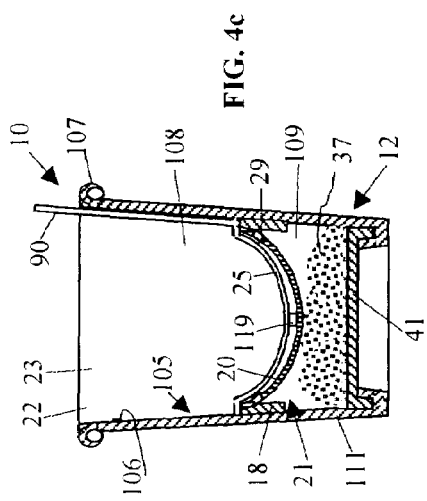
FIG. 4*d* is a sectional view showing the stacking of the brewing devices of FIG. 5.
Figure 4E:
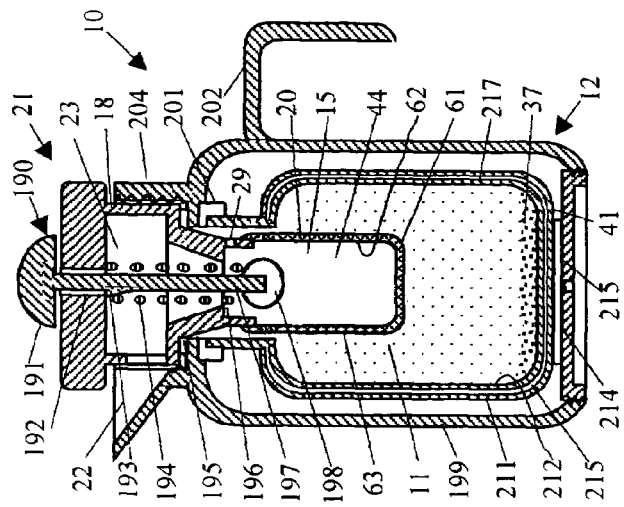
FIG. 4*e* is a sectional view for the device of FIG. 5 showing the coffee having a natural crema layer made by the device.

In FIGS. 4c–4e, the porous filter 20 is attached to a cylindrical body 18 and the cylindrical body is attached to the gas-impermeable barrier film 105 on the interior of the cup 12. The cylindrical body is made from plastics such as polyethylene and is manufactured by first extruding a polyethylene tube by an extruder, cutting a short cylinder from the tube and then forming the short cylinder to the desired tapering and shape for body 18. The body 18 is attached to the barrier film 105 sufficiently close the bottom 41 of the cup to make the exchange chamber 108 deep enough to receive a significant part of a second device 10, therefore saving transportation cost and storage space (FIG. 4d). The porous filter 20 adopts a convex shape. The gas-impermeable film cover 25 has a handle such a tab or string 90 and is conformed to the porous filter and is attached to the body 18 to form a barrier enclosure for the flavor-containing materials in the extraction chamber 109. A connection 119 is made between the film cover 25 and the porous filter to cause the porous filter to change from its convex shape (FIG. 4c) to a concave shape (FIG. 4e) when the film cover is removed by pulling the handle 90, therefore increasing the volume for the extraction chamber 109.

The brewing device 10 of FIG. 5 allows one to brew hot and iced coffee, latte, mocha and other beverages directly within a thermos 12. The brewing device 10 comprises a thermos 12 adapted to receive a supply of roasted coffee grounds 37 and a hot liquid and to allow the formation of a dispersion 11 therein for facilitating the extraction of the coffee grounds. The thermos comprises a thermos chamber 217 having an inner wall 212, an outer wall 211 and a heat insulation layer such as a vacuum or gas layer 215 sandwiched between the inner and outer walls and a housing 199 having beverage outlet 22, a handle 202 and a threaded inlet 204. A brew head assembly 21 of the device has a threaded body 18 for connecting the threaded inlet 204 of the thermos 12. The thermos chamber 217 is mounted between a top gasket 201 below the top wall of the housing and a lower gasket 215 above the bottom plate 214 in the housing.

The brew head assembly 21 comprises a porous filter 20 connected to the body 18 around a valve opening 196, a valve 190 for sealing the valve opening 196 (thus closing the thermos 12), a gasket 195 for forming a seal between the body 18 and the inlet 204 of the thermos, and a plurality of selective openings 29 adapted to allow air to enter the thermos 12 when the thermos is tilted to generate a liquid head on the porous filter to drive the beverage to the beverage outlet 22 while restricting the coffee grounds from passing through. The porous filter 20 comprises a dip-in filtration chamber 63 has a top opening open to the beverage outlet 22, a bottom and a surrounding side wall. The valve 190 comprises knob 191, a connection rod 197 extended through an opening 192, the transient beverage chamber 23 and the valve opening 196 of the body 18, a seal member 198 connected to the rod 192, a loaded spring 194, and a position selector 193 formed on the rod 197 and receivable in the opening 192. The valve 190 operates between a first position in which the valve member opens the valve opening 196 (as shown in FIG. 5) when the position selector is kept outside the opening 192 and a second position in which the valve member closes the valve opening 196 (not shown) when the position selector is received in the opening 192.

The porous filter 20 covers the valve member 198, and thus protecting valve 190 from potential male-function as a result of the coffee grounds being caught between the valve member 198 and the valve opening 196. The selective openings 29 are made sufficiently small to prevent medium to coarse coffee grounds from passing but sufficiently large to allow the liquid and finer coffee grounds in the selective openings to be readily pulled out by a vibration or a slight pulse of vacuum and pressure in the thermos 12. The removal of the liquid from selective openings allows air to enter the container when the thermos 12 is tilted to generate a liquid head to act on the first surface 61 to drive the liquid extraction through the porous filter and out of the beverage outlet 22. The selective openings are located on the side of the porous filter that is farther away form the beverage outlet 22 to make the liquid head acting on the selective openings 29 significantly smaller than the liquid head on the porous filter when the thermos is tilted towards the beverage outlet 22, therefore making the amount of liquid extraction and finer coffee grounds that is driven out of the selective openings by the small liquid head minimum, especially if number of selective openings 29 is significantly fewer than the number of filtration openings on the porous filter 20.

To brew coffee, one removes brew head assembly 21 from thermos 12 and adds a supply of roasted coffee grounds 37 into the thermos. Hot or boiling water is then added into the thermos to form a dispersion 11 to facilitate the extraction of the coffee grounds. The brew head assembly is then mounted to the thermos, which causes the liquid extraction part of dispersion 11 to enter the dip-in filtration chamber 63 as coffee 44. One may swirl or shake the thermos briefly to produce a crema layer 15 on the coffee 44. To dispense coffee in the thermos to a cup, one presses the knob 191 to place the valve 190 in its first position (as shown in FIG. 5) and tilt the thermos towards the beverage outlet 22 to generate a liquid head on the porous filter to drive the beverage through the porous filter, the valve opening 196 and out of the beverage outlet 22.

FIGS. 6–6b and 7–7c shows several improved versions of the brewing device disclosed in the FIG. 4 of the parent application Ser. No. 09/944,998, now issued as U.S. Pat. No. 6,725,763 B2. The improved device of FIG. 6 comprises a disposable brew head assembly 21, a disposable cup 12 and a supply of flavor-containing materials 37 sealed in the cup by a barrier enclosure formed between the gas-impermeable barrier film 105 on the interior surface of the cup and the gas-impermeable film cover 25 attached to the barrier film 105. The disposable brew head assembly 21 comprises a thin formed plastic sheet 182 made from a thin plastic sheet such as polyester, polyolefin or polystyrene sheet by thermal or mechanical means to achieve very low cost. The thin formed plastic sheet 182 have a cover 25, a beverage outlet 22 and vent opening 28 formed on the cover (FIGS. 6 and 6a), a cylindrical side wall 18 and a thin or narrow chamber 50 formed around the cylindrical body 18 to seal to the outer rim 107 of cup 12. The disposable brew head assembly 21 further comprises a porous filter 20, which may be a low cost disposable paper filter, cloth filter or woven or non-woven plastic filter, attached to the cylindrical body 18 to form a substantially closed transient beverage chamber 23.

A neck 177 is formed below the narrow chamber 50 to form a lock with the outer rim 107 of cup 12 to prevent the brew head assembly from being dislodged by the liquid head that is to be generated to act on the first surface 61 of the porous filter 20 to drive the filtration flow through the filtration openings. An outwardly tapered flange 179 is formed below the neck 177 to facilitate the mounting of the brew head assembly 21 to the cup 12. A flow facilitator 27 comprising a plurality of radial channels 29 (FIG. 6a) formed on the part of the narrow chamber 50 remote from the beverage outlet. One advantage with such a flow facilitator is that the radial channels 29 may be formed at the same time when the thin formed plastic sheet 182 is manufactured from a thin plastic sheet, therefore will not add any manufacturing cost to the brew head assembly 21. Another advantage for this flow facilitator is that the radial channels 29 will always be above the liquid when the cup is tilted to generate the liquid head to filter and drive the beverage out of the beverage outlet 22 (FIG. 6b).

In one preferred implementation for the device of FIG. 6, the thin formed plastic sheet 182 is made from a thin polypropylene, polyethylene or polystyrene sheet, the porous filter 20 made from a woven or non-woven polypropylene, polyethylene or polystyrene cloth, the cup 12 is made from a paper cardboard coated with the gas-impermeable barrier film 105, and the cover film 25 is similar to the barrier film 105. The manufacturing cost, excluding the cost of the coffee grounds 37 enclosed in the cup, for this preferred implementation is about US $0.05, which makes it quite economical to make the brewing device 10 a disposable brewer.

FIG. 7 shows an alternative disposable brew head assembly 21 to that of FIG. 6. In this disposable brew head assembly, the flow facilitator 27 comprises a second porous filter 183 having a plurality of selective openings 29 attached to the porous filter 20. The selective openings 29 are adapted to be either hydrophobic enough to prevent the liquid from entering selective openings 29 or smooth and large enough to cause the liquid in the selective openings 29 to be readily pulled out by a slight vacuum or vibration. In the later case, the selective opening needs to be small enough to prevent at least the coarser coffee grounds from passing through.

FIG. 7 is also used to illustrate a method to make iced beverage such as iced coffee or latte with this and other devices shown in FIGS. 6 and 7–7c. To make an iced coffee, one pours hot or boiling water into the cup 12 to form a dispersion 11 with the roasted coffee grounds. After about 1 minute, ice cube or crushed ice 178 are added into the dispersion 11. The ice 178 quickly quenches or stops further extraction of the flavor-containing materials 37 by water, therefore preventing certain bitter flavors or "bad" chemicals from being extracted out of the flavor-containing materials and improving the coffee taste. The brew head assembly 21 is then mounted to the cup so that the rim 107 is received by the narrow chamber 50 and locked together by the neck 177.

To make an iced latte, about ⅓ cup hot or boiling water is poured into the cup to form a dispersion with the roasted coffee grounds. After about 1 minute, ice cube or crushed ice 178 and cold milk are introduced, either simultaneously or separately, into dispersion 11 to fill the cup. The ice 178 quickly quenches or stops further extraction of the flavor-containing materials 37. The assembly 21 is then mounted to the cup so that the rim 107 is received by chamber 50 and locked together by neck 177. Chocolate milk is used to replace the milk to brew iced mocha. To avoid dilution of the milk by water, one may heat ½ to ¾ cup of milk and pour the hot milk into the cup 12 to form a dispersion 11 with the roasted coffee grounds. After about 1 minute of extraction by the hot milk, ice cube or crushed ice 178 are added into the dispersion 11 to quench the extraction process.

FIG. 7a shows a second alternative disposable brew head assembly 21 to that of FIG. 6. In this disposable brew head assembly, porous filter 20 is attached to the inside wall of the body 18 of the thin formed plastic sheet 182 and the flow facilitator 27 comprises a first vent opening 29a for communicating the air space in the cup 12 with atmosphere and a second vent opening 29b to communicate the substantially closed transient chamber 23 with atmosphere. The device further comprises a layer of roasted coffee grounds 37b and a layer of soluble materials such milk power, cocoa, creamer, sugar or any of their mixtures 37a in the cup 12 and a fixer 130 for preventing the movement of the coffee grounds 37b and soluble materials 37a. The fixer comprises a liquid-breakable or soluble film 133 and a peripheral edge 134 to attach the film to the side wall of the cup 12. It is appreciated that the film 133 can be an insoluble film or sheet attached to the side wall of the cup 12 by a liquid-breakable or soluble adhesive, which allows the insoluble film or sheet to detach from the side wall of the cup to release the flavor-containing materials below to form a dispersion to facilitate the extraction.

FIG. 7b shows a third alternative disposable brew head assembly 21 to that of FIG. 6. This disposable brew head assembly 21 is irremovably attached and sealed in a gas-tight manner to the rim 107 of the cup 12. A liquid fill opening 185 is formed on the top cover 25 of the thin formed plastic sheet 182 to allow the addition of liquid onto the porous filter and subsequently into the cup. An air opening 29a is formed on the porous filter to allow air to enter the cup. A gas-impermeable cover film 25a has a tab 90 is sealed to the thin formed plastic sheet 182 to cover the liquid fill opening 185 and beverage outlet 22. The thin formed plastic sheet 182 is formed from a thin plastic sheet that comprises a layer of formable and gas-impermeable materials such as EVOH or poly(vinylidine dichloride) (trade name Saran) so that a barrier enclosure is formed by the gas-impermeable barrier film 105 on the inner surface of the cup, the gas-impermeable cover film 25a and the thin formed plastic sheet 182 to enclose the flavor-containing materials.

FIG. 7c shows a forth alternative brew head assembly 21 to that of FIG. 6. Unlike the brew head assemblies in FIGS. 6 and 7–7b, this brew head assembly 21 has a filter station 187 comprising a filter reception chamber 188 and a filter support plate 176 with numerous large openings 175 for receiving a disposable porous disc filter 122. The disc filter 122 has a pre-formed edge 169 adapted to be sufficiently rigid to fit frictionally into the filter reception chamber 188, a first surface 61 for facing the flavor-containing materials 37 in the cup 12, a second surface for mating with the support plate 176 and a tab 186 for allowing one to pull the used disc filter out of the filter station. This configuration allows the disc filter 122 to be disposable after each cup of beverage is brewed while allowing the rest of the brew head assembly 21 to be used many times, thus saving cost. It is appreciated that the disposable disc filter 122 may adopt a convex shape or may be shaped to form a dip-in-filtration chamber to be used with a bottle or thermos of FIG. 5.

FIGS. 8–8a and 9–9c show two alternatives to the brewing device of FIG. 2 with a dual-container configuration. The brewing device 10 of FIG. 8 comprises a conventional paper or plastic cup 12, a brew head assembly 21 having a body 18, a gas-impermeable barrier container 127 with sufficiently rigid side wall 232, a porous filter 20 attached to the barrier container, a flow facilitator 27 having a plurality of selective openings 29 located around the rim 107 to allow air to enter the barrier container when cup 12 is tilted at different directions, a supply of flavor-containing materials 37 in the barrier container, and a gas-impermeable film cover 25 sealed to the barrier container 127 to form a barrier enclosure for the supply of flavor-containing materials. An air gap 126 may be formed between the side walls of the barrier container 127 and the cup 12 to function as a heat insulator after a hot liquid to be introduced into the barrier container 127 to brew beverage (FIG. 8a).

The brewing device 10 of FIG. 9 is essentially the same as that of FIG. 8 except that the barrier container 127 has flexible film side wall 135, that a vent opening 163 is formed on the side wall of cup 12 to allow film side wall 135 to collapse as the coffee is being driven out of the barrier container 127 (FIG. 9b), and that the porous filter 20 comprises a coffee powder removing mechanism 233 for making the brewed coffee substantially free of coffee powders or fines without significantly reducing the flow rate of coffee through said filter.

To achieve sufficiently high coffee flow rate through the porous filter 20 under the relatively small liquid head generated when the brewing device 10 is tilted, the porous filter needs to be fairly open. As a result, at least some of the coffee fines or powders in the roasted coffee grounds 37 will pass through the porous filter and become part of the beverage. Such coffee fines is known to be present in the coffee made from a French press coffee maker because French press also has to use fairly open filter. Some people like the coffee fines in their coffee but many others do not like because the coffee with coffee fines in it do not taste smooth enough. There has not yet been a known solution to resolve the coffee fine issue for French press coffee.

The inventor noted that when a tight porous filter such as a paper filter for automatic drip coffee makers or a wire/cloth mesh filter with more than about 200 holes per inch was used in brewing device 10, a thin layer of coffee fines was formed on the first surface 61. This thin layer of coffee fines is highly resistant to flow, thus rendering the coffee flow slow to drink after the device 10 is tilted for several seconds. Such a layer of coffee fines did not form on more open filters such the wire mesh filters used in conventional French press coffee makers. But again, the resulting coffee from such open filter would contain a significant amount of coffee fines.

The inventor discovered that by making the filtration openings 148 in porous filter 20 larger than the size of the coffee fines in roasted coffee grounds, the coffee fines will pass through the first surface 61 and enter the porous filter, therefore preventing the flow-resistant layer of coffee fines from forming on the first surface 61. The inventor also discovered that by increasing the effective length of the filtration openings 148 in the porous filter 20, the coffee fines could actually be adsorbed and/or trapped on the interior walls or surfaces of the filtration openings 148 when the coffee fines, which is smaller than the filtration openings, flows with the liquid extraction in the filtration openings. It was further discovered that by making the filtration openings 148 sufficiently interconnected, the coffee fines adsorbed and/or trapped on the interior walls of the filtration openings 148 tends to not reduce the coffee flow rate through the porous filter. It was further discovered that by making the porous filter 20 generally asymmetric, i.e. to have larger filtration openings near the first surface 61 and smaller filtration openings near the second surface 62, the coffee could flow through the filter 20 under the liquid head faster and the resulting coffee contains less coffee fines.

FIGS. 9a and 9c are schematic sectional views for a part of the porous filter 20 comprising the coffee powder or fine removing mechanism 233 before and after the coffee fines are adsorbed or trapped on the interior walls or surfaces of the filtration openings 148. Here the porous filter can be more than three times as thick as a regular cloth mesh filter or a conventional paper filter for drip coffee makers to make sure the effective length of the filtration openings 148 is sufficiently long to allow enough time for the adsorption and/or trapping of the coffee fines. The hatched lines indicates the interconnections between the filtration openings and the more densely hatched lines near the second surface 62 indicates smaller filtration openings near that surface. The preferred materials used to construct a porous filter 20 comprising the coffee fine removing mechanism 23 include cellulose or paper fibers, open-cell foam materials and polyester or nylon fibers. The packing of such fibers when forming such porous filter needs to be relatively loose to ensure that the filtration openings 148 are larger than the coffee fines or powders to be removed. It is appreciated that a porous filter with the coffee fine removing mechanism 23 can be used in all brewing devices 10 to make coffee beverages free of coffee fines. It is especially appreciated that the porous filter with the coffee fine removing mechanism 23 can be in the form of a removable filter disc or filter chamber shown in FIG. 7c. It is further appreciated that the porous filter with the coffee fine removing mechanism 23 in the form of a removable filter disc or filter chamber can be used in French press type coffeemakers to make French press coffee free of coffee fines.

FIGS. 10–10c and 11–11a illustrate two brewing devices 10 in which the flavor-containing materials 37 is enclosed in brew head assembly 21 rather than in container 12. The brew head assembly 21 of FIG. 10 comprises a substantially cylindrical body 18, a porous filter 20 connected to the top end of the body 18, an enclosure member 138 connected to the lower end of the body 18 to form a substantially closed containing chamber 237, a predetermined amount of flavor-containing materials 37 enclosed in the containing chamber 237, and a flow facilitator 27 having a plurality of selective openings 29 around the cylindrical body to allow at least one selective opening to be above liquid level when the cup 12 is tilted to pour beverage. The enclosure member 138 comprises a porous sheet 137 having a plurality of elongated cuts or slots 136 (FIG. 10a) dimensioned to restrict the flavor-containing materials from exiting the containing chamber during storage/handling and to communicate the containing chamber 237 with the cup 12 during brewing process.

The brew head assembly 21 may be sealed in a barrier enclosure or a gas impermeable pouch (not shown) to preserve the freshness of the supply of flavor-containing materials 37 in the containing chamber. To brew coffee, one removes the assembly 21 from the pouch and connects it to the cup 12 as shown in FIG. 10. To prevent the assembly 21 from being pushed out by the liquid head when the cup is tilted, the body 18 is made concave to achieve a better gripping of the body 18 by the side wall of the cup 12. The cylindrical body 18 may contain a rubbery, matted finishing or water-activated adhesive on its outer surface or may be adapted to expand when hot liquid is added into the cup to achieve a better gripping of the body 18 by the side wall of the cup 12.

The flow facilitator 27, in this or other exemplar embodiments, may comprise a porous hydrophobic section on the porous filter. The hydrophobicity prevents the dispersion 11 to enter or wet the selective openings in the hydrophobic section, therefore allowing air to pass freely. The hydrophobic section may be produced by printing a fluid containing hydrophobic molecules or functional groups on certain part of a porous filter and then attaching the hydrophobic molecules or functional groups to the substrate surface. The hydrophobic section may also be formed by attaching hydrophilic molecules or functional groups to part of a hydrophobic porous filter, by attaching a hydrophobic porous filter to a hydrophilic porous filter, or by including hydrophobic fibers into a hydrophilic porous filter during its production.

If the porous sheet 137 of the enclosure member 138 is a flexible or soft film or filter such as a thin paper filter or polyethylene film, the elongated slots or cuts 136 will expand greatly when liquid is poured into the containing chamber 237 through the porous filter 20, thereby causing most of the flavor-containing materials 37 to flow with the liquid into the cup 12 (FIG. 10b). If the porous sheet 137 is less flexible or when the slot is not long enough or is simply removed or absent, at most of the flavor-containing materials will remain in the containing chamber 237 when liquid is poured into the containing chamber 237 through the porous filter 20 (FIG. 10c). In the later case, the containing chamber must be sufficiently large, preferably having a volume more than twice as large as the volume of the flavor-containing materials 37 enclosed in it, to allow the liquid poured onto the porous filter 20 to flow quickly into the cup as well as to allow a sufficiently dilute dispersion 11 in which the concentration of the coffee grounds 37 sufficiently low to be formed in the containing chamber to facilitate the extraction and the flow of the resulting liquid extraction through the porous filter 20 under the liquid head generated when the container is tilted.

In FIG. 11, the enclosure member 138 is a flexible film bag 135 in its folded position prior to the introduction of liquid into the containing chamber 237. After the liquid introduction, the film bag 135 unfolds to receive the liquid to form a dispersion 11 inside the bag (FIG. 11a). The function of the flexible bag 135 here is similar to that of the flexible bag 135 in FIG. 9b. An advantage for folding the bag 135 as shown in FIG. 11 is to reduce the volume of the brew head assembly 21 allow it to be sealed in a small, space-saving barrier enclosure or a gas impermeable pouch (not shown) to preserve the freshness of the supply of flavor-containing materials 37 in the containing chamber 237. It is appreciated that the enclosure member 138 in FIGS. 10 and 11 can be replaced by a liquid breakable or activable member such as a liquid-soluble or liquid-breakable film or adhesive layer that may be dissolved, broken or decomposed upon contacting the liquid or upon the introduction of liquid into the containing chamber 237, therefore releasing the flavor-containing materials 37 in the containing chamber into the container 12.

The scope of the invention is obviously not restricted or limited to the embodiments described by way of examples and depicted in the drawings, there being numerous changes, modifications, additions, and applications thereof imaginable within the purview of the claims.

What is claimed is:

1. A device for brewing a beverage such as coffee, espresso, cappuccino, latte, mocha or tea from flavor-containing materials comprising:
    a container having a top opening, a closed bottom and a side wall between said top opening and closed bottom;
    a predetermined amount of flavor-containing materials in said container, said materials being adapted to be extracted in said container by a liquid to produce a liquid extraction therein;
    a barrier enclosure for providing a substantially gas-impermeable barrier to said flavor-containing materials in said container to prevent the loss of aroma and/or flavor in said flavor-containing materials, thereby preserving the freshness of said flavor-containing materials during the storage of said device;
    a porous filter connected or adapted to connect to said container, said porous filter comprising a first surface adapted to contact said flavor-containing materials and liquid extraction in said container, a plurality of filtration openings adapted to allow liquid extraction to pass through as a beverage while block all or substantially all solids and a second surface for receiving the beverage from said filtration openings;
    wherein said porous filter and said container are connected and constructed in such a way that said container can be tilted to generate a liquid head to act on said first surface of said porous filter to drive the liquid extraction out of said container through said filtration openings to said second surface of said porous filter, thereby producing the beverage; and
    wherein said barrier enclosure comprises a substantially gas-impermeable layer for said side wall and said bottom of said container and a cover substantially impermeable to gas for sealing said flavor-containing materials in said container to prevent the loss of aroma and/or flavor in said flavor-containing materials, said cover being adapted to allow at least a section of said cover to be removable or breakable to allow a liquid to be added to extract said flavor-containing materials in said container.

2. A device as defined in claim 1 wherein said cover comprises a thin aluminum sheet attached to said top opening of said container, a weakened border line around said section, a lever for enabling a user to remove said section to form a sufficiently large beverage outlet for facilitating the introduction of hot liquid to said porous filter and into said container, and a lip protector on at least the part of said cover for protecting one's lip from being burned by the heat on said cover conducted from the hot liquid.

3. A device as defined in claim 1 wherein said container is a disposable cup with said side wall tapered to make said top opening larger than said bottom and wherein said cover is located sufficiently below said top opening to form a deep chamber above said cover to receive at least part of another said device, thereby reducing the need for storage space.

4. A device as defined in claim 1 wherein said substantially gas-impermeable layer comprises at least one of a metal and a barrier polymer.

5. A device as defined in claim 4 further comprising at least one sealant layer on said gas-impermeable layer.

6. A device as defined in claim 4 wherein said container is one of a paper cup and a foam cup.

7. A device as defined in claim 1 wherein said cover of said barrier enclosure is located a predetermined distance below said top opening of said container but above said porous filter so that said barrier enclosure is located substantially below said top opening of said container.

8. A device as defined in claim 1 wherein said substantially gas-impermeable layer of said barrier enclosure is at least partly separated from said container.

9. A device as defined in claim 8 wherein the separation between said substantially gas-impermeable layer and the side wall of said container is sufficiently large that a sufficient air gap is formed as a heat insulator for said side wall of said container during the brewing of hot beverage.

10. A device as defined in claim 8 wherein said substantially gas-impermeable layer of said barrier enclosure is a substantially gas-impermeable flexible film at least partly separated from the side wall of said container so that said barrier enclosure can change in size when the beverage is filtered through said porous filter.

11. A device as defined in claim 10 further comprising a body having a peripheral wall attached or adapted to attach to said container and an opening to which said porous filter is attached to prevent said flavor-containing materials in said barrier enclosure from exiting via said opening of said body, wherein said substantially gas-impermeable film adopts the form of a bag attached to said body.

12. A device as defined in claim 10 further comprising an opening to provide communication between atmosphere and the space between said gas-impermeable layer and the wall of said container, thereby facilitating the change of said barrier enclosure in size in said container.

13. A device as defined in claim 1 further comprising a body having a peripheral wall attached to said container and an opening closed by said porous filter to prevent said flavor-containing materials in said barrier enclosure from exiting said opening of said body, wherein said cover of said barrier enclosure is sealed to said body.

14. A device as defined in claim 13 wherein said gas-impermeable layer of said barrier enclosure is sealed to said body in such a way that said substantially gas-impermeable layer and said cover are connected by said body.

15. A device as defined in claim 13 wherein said gas-impermeable layer of said barrier enclosure is located on the interior surface of said container.

16. A device for brewing a beverage such as coffee, espresso, cappuccino, latte, mocha or tea from flavor-containing materials comprising:
    a container having a top opening, a closed bottom and a side wall between said top opening and closed bottom;
    a predetermined amount of flavor-containing materials in said container, said materials being adapted to be extracted in said container by a liquid to produce a liquid extraction therein;

a barrier enclosure for providing a substantially gas-impermeable barrier to said flavor-containing materials in said container to prevent the loss of aroma and/or flavor in said flavor-containing materials, thereby preserving the freshness of said flavor-containing materials during the storage of said device;

a porous filter connected or adapted to connect to said container, said porous filter comprising a first surface adapted to contact said flavor-containing materials and liquid extraction in said container, a plurality of filtration openings adapted to allow liquid extraction to pass through as a beverage while block all or substantially all solids and a second surface for receiving the beverage from said filtration openings;

wherein said porous filter and said container being connected and constructed in such a way that said container can be tilted to generate a liquid head to act on said first surface of said porous filter to drive the liquid extraction out of said container through said filtration openings to said second surface of said porous filter, thereby producing the beverage; and wherein said barrier enclosure comprises a chamber made from a substantially gas-impermeable material, said chamber being adapted to contain at least one said container to prevent the loss of aroma and/or flavor in said flavor-containing materials and being adapted to be opened to allow a user to remove said at least one container.

17. A device for brewing a coffee beverage such as coffee, latte or mocha substantially free of coffee powders or grounds in a container from flavor-containing materials comprising roasted coffee grounds comprising:

a porous filter having a first surface adapted to contact a supply of flavor-containing materials comprising roasted coffee grounds to be extracted by a hot liquid to produce a liquid extraction, filtration openings for allowing the liquid extraction to pass through, and a second surface for receiving the liquid extraction from said filtration openings;

a connector for connecting said porous filter to a container, which container is adapted to allow the formation of a dispersion of roasted coffee grounds and liquid extraction therein;

a coffee powder removing mechanism for causing the coffee beverage brewed to have substantially reduced amount of coffee fines or grounds to improve the smoothness of the resulting coffee beverage without reducing or significantly reducing the flow rate of said liquid extraction through said filtration openings;

wherein said porous filter and connector being adapted to allow the container to be tilted to generate a liquid head to act on said first surface of said porous filter to drive the liquid extraction through said filtration openings to said second surface to produce a coffee beverage substantially free of coffee fines; and wherein said coffee powder removing mechanism comprises a second filter located above or downstream said porous filter to filter the liquid extraction from said second surface of said porous filter, thereby producing a coffee beverage with substantially reduced coffee fines or grounds.

18. A device for brewing a coffee beverage such as coffee, latte or mocha substantially free of coffee fines from roasted coffee grounds comprising:

a porous filter having a first surface adapted to contact a supply of flavor-containing materials comprising roasted coffee grounds to be extracted by a hot liquid to produce a liquid extraction, filtration openings for allowing the liquid extraction to pass through, and a second surface for receiving the liquid extraction from said filtration openings;

wherein said porous filter including a coffee fine removing mechanism comprising a plurality of said filtration openings adapted to be sufficiently large to allow coffee fines to pass through said first surface into said porous filter and sufficiently interconnected to prevent clogging of said filtration openings, thereby restricting the accumulation of coffee fines on said first surface and facilitating the liquid extraction flow through said filtration openings, and a sufficient thickness of porous material between said first and second surfaces to allow the coffee fines sufficient time to be trapped by and/or adsorbed on the interior walls of said filtration openings; and wherein said porous filter is connected or adapted to connect to a container, which container is adapted to allow the formation of a dispersion of roasted coffee grounds and liquid extraction therein, and is adapted to allow a small liquid head or force exerted to said porous filter to drive the liquid extraction through said filtration openings to said second surface of said porous filter, thereby producing a brewed coffee beverage substantially free of coffee fines at or on said second surface.

19. A device as defined in claim 18 wherein said porous filter is a disposable filter adapted to be received by a body, said body being adapted to connect or mount to the container.

20. A device as defined in claim 19 is a French press type coffeemaker for making a cup of French press coffee substantially free of coffee fines.

21. A device as defined in claim 18 wherein said porous filter further comprises a peripheral edge adapted to fit frictionally into a filter receptacle chamber or the container.

22. A device for brewing a beverage such as coffee, espresso, latte or mocha from flavor-containing materials in a container having a rim at or near its top opening comprising:

a lid comprising a substantially cylindrical side wall, a narrow chamber around said substantially cylindrical side wall and adapted to receive and seal to the rim of the container, a beverage outlet from which the beverage is dispensed or drunk, and a neck near or below said narrow chamber for preventing the rim of the container from being dislodged from said narrow chamber;

a porous filter attached to said lid, said porous filter comprising a first surface adapted to contact the flavor-containing materials in the container, a plurality of filtration openings to filter liquid extraction to produce a beverage and a second surface for receiving the beverage from said filtration openings and providing the beverage to said beverage outlet of said lid;

wherein said lid and porous filter are adapted to allow the container to be tilted to generate a liquid head to act on said first surface of said porous filter to drive the liquid extraction in the container through said filtration openings first to said second surface and later to said beverage outlet to be drunk or dispensed; and wherein said narrow chamber comprises at least one channel having one end adapted to communicate with the inside of the container and another end with atmosphere and located sufficiently away from said beverage outlet to allow air to enter the container when the container is tilted to generate said liquid head.

23. A device for brewing a beverage such as coffee, espresso, latte or mocha from flavor-containing materials in a container having a rim at or near its top opening comprising:
- a lid comprising a substantially cylindrical side wall, a narrow chamber around said substantially cylindrical side wall and adapted to receive and seal to the rim of the container, a beverage outlet from which the beverage is dispensed or drunk, and a neck near or below said narrow chamber for preventing the rim of the container from being dislodged from said narrow chamber;
- a porous filter attached to said lid, said porous filter comprising a first surface adapted to contact the flavor-containing materials in the container, a plurality of filtration openings to filter liquid extraction to produce a beverage and a second surface for receiving the beverage from said filtration openings and providing the beverage to said beverage outlet of said lid;
- wherein said lid and porous filter are adapted to allow the container to be tilted to generate a liquid head to act on said first surface of said porous filter to drive the liquid extraction in the container through said filtration openings first to said second surface and later to said beverage outlet to be drunk or dispensed; and
- a first opening at a first predetermined location of said lid for providing communication between atmosphere and a transient beverage chamber between said second surface of said porous filter and the top end of said lid and a second opening at a second predetermined location of said lid for providing communication between atmosphere and the container.

24. A device as defined in claim 23 wherein said second opening has a first end in communication with the space between the bottom of the container and said porous filter and a second end in communication with said transient beverage chamber that communicates with atmosphere via said first opening.

25. A device as defined in claim 23 wherein said second opening is located on or in said porous filter attached to said lid to allow air to enter the container when the container is tilted to generate said liquid head on said first surface of said porous filter, thereby facilitating the filtration of the liquid extraction into said transient beverage chamber.

26. A device as defined in claim 23 wherein said lid further comprises a cover at its top end to make said transient beverage chamber substantially closed by said cover so that when the container is tilted to generate said liquid head the liquid extraction and flavor-containing materials between said first surface of said porous filter and the bottom of the container is filtered by said porous filter into said transient beverage chamber and guided by said transient beverage chamber toward said beverage outlet.

27. A device as defined in claim 26 wherein said lid is formed from a thin plastic sheet to be disposable, said lid further comprising an outwardly tapered flange below said neck to facilitate the mounting of said device to the container.

28. A device as defined in claim 23 wherein said first and second openings are located sufficiently away from said beverage outlet to maintain said communications between the atmosphere and the transient beverage chamber and container when the container is tilted to generate said liquid head, thereby allowing air to enter or exit the container and transient beverage chamber substantially freely.

29. A device as defined in claim 23 further comprising a containing chamber below said first surface of said porous filter for a supply of flavor-containing materials.

30. A device for brewing a coffee beverage such as coffee, espresso, cappuccino, latte, mocha or tea in a container from roasted coffee grounds comprising:
- a porous filter connected or adapted to connect to a container, which container having a top opening, a closed bottom and a side wall, said porous filter comprising a first surface adapted to contact roasted coffee grounds to be extracted by a liquid to produce a liquid extraction in the container, filtration openings adapted to allow the liquid extraction to pass through as a beverage while block substantially all coffee grounds and a second surface for receiving the coffee beverage from said filtration openings;
- a selective opening for allowing air to pass through but to restrict the roasted coffee grounds from passing through;
- wherein said porous filter is adapted to allow the container to be tilted to generate a liquid head to act on said first surface of said porous filter to drive the liquid extraction out of the container through said filtration openings to said second surface of said porous filter, thereby producing the coffee beverage; and
- wherein said selective opening is adapted to be sufficiently small to prevent at least the coarser coffee grounds from passing through but to be sufficiently large to enable the liquid extraction and finer coffee grounds in said selective opening to be readily pulled out by at least one of a vibration and a slight vacuum or pressure in the container, the removal of the liquid extraction from said selective opening allowing air to enter the container through said selective opening when the container is tilted to generate said liquid head to drive the liquid extraction out of the container through said filtration openings.

31. A device as defined in claim 30 further comprising an outlet for the beverage received by said second surface, wherein said selective opening is so positioned that the liquid head acting on said selective opening is significantly smaller than the liquid head on at least part of said filtration openings when the container is tilted towards said outlet to generate said liquid head, thereby minimizing the volume of liquid extraction that passes through said selective opening under the liquid head and consequently minimizing the amount of finer coffee grounds carried by said volume of liquid extraction through said selective opening.

32. A device for brewing a beverage such as coffee, espresso, cappuccino, latte, mocha or tea directly in a thermos from flavor-containing materials comprising:
- a thermos comprising a beverage outlet, an inlet and a thermos chamber adapted to receive a supply of flavor-containing materials and a hot liquid and to allow a dispersion of the flavor-containing materials and hot liquid to be formed therein for facilitating the extraction of the flavor-containing materials by the hot liquid;
- a body adapted to connect to said inlet and to form a substantially water tight seal to said inlet;
- a valve located in said body and comprising a valve opening and a seal member, said valve being adapted to operate between a first position in which said seal member opens said valve opening, thereby opening said thermos chamber to said beverage outlet, and a second position in which said valve member closes the valve opening, thereby closing said thermos chamber to prevent loss of aroma and heat from the dispersion of the flavor-containing materials and hot liquid;
- a porous filter connected to said body, said porous filter comprising a first surface adapted to contact the dispersion in said thermos chamber, filtration openings adapted to allow the liquid extraction to pass through as a beverage while block substantially all solid flavor-containing materials, and a second surface for receiving the coffee beverage from said filtration openings;

wherein said body, porous filter and thermos are adapted to allow the thermos to be tilted to generate a liquid head to act on said first surface of said porous filter to drive the liquid extraction out of said thermos chamber through said filtration openings to said second surface of said porous filter and subsequently out of said beverage outlet when said valve is in its first position; and wherein the porous filter is adapted to cover said valve member and said valve opening to prevent the solid flavor-containing materials in said thermos chamber from reaching said valve, thereby ensuring that said valve member can close said thermos chamber to prevent loss of aroma and heat in the dispersion of the flavor-containing materials and hot liquid when said valve is in its second position.

33. A device for brewing a beverage such as coffee, espresso, latte or mocha in a container from flavor-containing materials comprising:

a body connected or adapted to connect to a container;

a predetermined amount of flavor-containing materials adapted to be extractable in a liquid to produce a liquid extraction;

a porous filter connected to said body, said porous filter comprising a first surface adapted to contact said flavor-containing materials, a plurality of filtration openings adapted to allow liquid extraction to pass through as beverage while block all or substantially all solids and a second surface for receiving the beverage from said filtration openings;

an enclosure member connected to said body to form a substantially closed containing chamber between said porous filter and said enclosure member to enclose said predetermined amount of flavor-containing materials, said enclosure member being adapted to allow said flavor-containing materials to mix with liquid within at least one of said containing chamber and the container to produce a dispersion for facilitating the extraction of said flavor-containing materials;

wherein said body and porous filter are adapted to allow the container to be tilted during use to generate a liquid head to act on said first surface of said porous filter to drive the liquid extraction through said filtration openings as the beverage to said second surface; and a flow facilitator having at least one selective opening adapted to allow air to enter the space below said porous filter but to restrict said flavor-containing materials in said containing chamber or the container from passing through.

34. A device for brewing a beverage such as coffee, espresso, cappuccino, latte or mocha in a container from a flavor-containing materials comprising:

a porous filter connected or adapted to connect to a container having a top opening, a closed bottom and a side wall between said top opening and closed bottom, said porous filter comprising a first surface adapted to contact flavor-containing materials and liquid, a plurality of filtration openings adapted to allow the liquid extraction resulting from the interaction of a flavor-containing materials and liquid to pass through while to block substantially all solid flavor-containing materials and a second surface for receiving the liquid extraction from said filtration openings;

an extraction chamber for enclosing a flavor-containing materials, said extraction chamber being formed by at least said first surface of said porous filter and being adapted to be sufficiently large in volume to allow a dispersion of the flavor-containing materials in liquid to be formed after a liquid is introduced into the container to brew a beverage;

an exchange chamber between said second surface of said porous filter and the top opening of the container and adapted to contain an amount of liquid, which amount of liquid is separated from the flavor-containing materials in said extraction chamber by said porous filter;

wherein said exchange chamber, porous filter and extraction chamber are adapted to allow the container to be moved in at least one of a swirling, vibrating, tilting and shaking motions to cause the liquid in said exchange chamber to interchange with the liquid extraction in said extraction chamber through said filtration openings in such a way that the concentration of the flavor components in the liquid in said exchange chamber increases as the container is being moved in at least one of the swirling, vibrating, tilting and shaking motions, thereby producing a supply of beverage or liquid extraction free or substantially free of solid flavor-containing materials in said exchange chamber for drinking or dispensing;

wherein said exchange chamber, porous filter and extraction chamber are adapted to allow the container to be tilted to generate a liquid head to act on said first surface of said porous filter to drive the liquid extraction in said extraction through said filtration openings into said exchange chamber; and at least one selective opening adapted to allow air to pass through from atmosphere into said extraction chamber but to restrict the flavor-containing materials from passing through when the container is tilted to generate a liquid head to act on said first surface of said porous filter to drive the liquid extraction through said filtration openings.

35. A device for brewing a beverage such as coffee, espresso, cappuccino, latte, mocha or tea in a container from flavor-containing materials, said container having a rim, a bottom and a side wall between said rim and bottom, said device comprising:

a predetermined amount of flavor-containing materials adapted to be extracted by a liquid to produce a liquid extraction;

a porous filter connected or adapted to connect to said container, said porous filter comprising a first surface adapted to contact said flavor-containing materials and liquid extraction, a plurality of filtration openings adapted to allow the liquid extraction to pass through as a beverage while block all or substantially all solids and a second surface for receiving the beverage from said filtration openings;

wherein said porous filter and container are connected in such a way that the container can be tilted to generate a liquid head to act on said first surface of said porous filter to drive the liquid extraction through said filtration openings to said second surface of said porous filter as the beverage to be drunk or poured from the container;

a barrier enclosure for receiving said flavor-containing materials and providing a substantially gas-impermeable barrier to said flavor-containing materials to prevent the loss of aroma and/or flavor in said materials, thereby preserving the freshness of said flavor-containing materials during the storage of said device; and wherein said barrier enclosure comprises a substantially gas-impermeable thin member comprising a barrier layer on which said flavor-containing materials is located or received and a substantially gas-impermeable cover comprising a barrier film connected to said gas-impermeable thin member to form said barrier enclosure for sealing said flavor-containing materials to preserve its freshness and aroma and/or flavor, said substantially gas-impermeable cover being adapted to allow at least a section of said cover to be removable or breakable to allow a liquid to be added into said barrier enclosure to extract said flavor-containing materials therein.

36. A device as defined in claim 35 wherein said substantially gas-impermeable thin member of said barrier enclosure is located directly on the interior surface of said container.

37. A device as defined in claim 35 wherein said porous filter is connected to said container at a position between said flavor-containing materials in said barrier enclosure and said substantially gas-impermeable cover so that said barrier enclosure encloses said porous filter.

38. A device as defined in claim 35 wherein said substantially gas-impermeable thin member of said barrier enclosure is sufficiently flexible and is at least partly separated from the interior surface of the container so that said barrier enclosure can change in size or volume in the container.

39. A device as defined in claim 35 further comprising a vent opening to provide communication between atmosphere and the space between the interior surface of the container and said substantially gas-impermeable thin member, thereby facilitating said change of said barrier enclosure in size or volume in said container.

40. A device as defined in claim 35 wherein said substantially gas-impermeable thin member of said barrier enclosure is connected to said bottom of said container and said substantially gas-impermeable cover is connected to said substantially gas-impermeable thin member to form said barrier enclosure for said flavor-containing materials in said container.

41. A device as defined in claim 35 wherein said porous filter is attached to a body adapted to connect to the container, said body having a side wall and an opening to which said porous filter is attached to filter said flavor-containing materials, and wherein said substantially gas-impermeable cover of said barrier enclosure is sealed to said body above said porous filter.

42. A device as defined in claim 35 further comprising a body connected or adapted to connect to the container, said body having a side wall and an opening to which said porous filter is attached to prevent said flavor-containing materials from exiting said opening of said body, wherein said substantially gas-impermeable cover is connected to said body above said porous filter and said substantially gas-impermeable thin member is connected to or formed in said body to form said barrier enclosure for said flavor-containing materials.

43. A device as defined in claim 35 wherein said barrier enclosure is adapted to be received in and connected to the container, wherein said substantially gas-impermeable thin member further comprises a gas-impermeable chamber for receiving said flavor-containing materials and a chamber opening to which said porous filter is attached to allow the container to be tilted to generate said liquid head to act on said first surface of said porous filter to drive the liquid extraction out of said gas-impermeable chamber through said filtration openings, and wherein said substantially gas-impermeable cover is connected to said substantially gas-impermeable thin member above said porous filter to close said chamber opening.

44. A disposable device for brewing a beverage such as coffee, espresso, latte or mocha in a container having a bottom, a side wall and a top opening from flavor-containing materials comprising:

a predetermined amount of flavor-containing materials adapted to be extracted in a liquid to produce a liquid extraction;

a body connected or adapted to connect to a container;

a porous filter attached to said body, said filter comprising a first surface adapted to contact said flavor-containing materials, a plurality of filtration openings to filter liquid extraction to produce a beverage and a second surface for receiving the beverage from said filtration openings;

a thin member connected to said body and located below said porous filter to form a chamber between said filter and said thin member to contain said flavor-containing materials;

wherein said body and porous filter are adapted to allow the container to be tilted during use to generate a liquid head to act on said first surface of said porous filter to drive the liquid extraction through said filtration openings as the beverage to said second surface;

wherein said thin member is adapted to break at least partly when it is in contact with the liquid to allow said flavor-containing materials in said chamber to fall out of said chamber and into the container, thereby producing a freely movable dispersion of the flavor-containing materials in the liquid in the container to facilitate the extraction of said flavor-containing materials; and wherein said porous filter comprises at least one opening adapted to allow air to enter the container when the container is tilted to generate said liquid head on said first surface of said porous filter to drive the liquid extraction out of the container as the beverage to said second surface, thereby facilitating the filtration of said dispersion by said porous filter.

45. A device for brewing a beverage such as coffee, espresso, latte or mocha in a container having a bottom wall, a side wall and a top opening from flavor-containing materials comprising:

a flavor-containing materials adapted to be extracted by a hot liquid;

a porous filter comprising a first surface adapted to contact said flavor-containing materials, a plurality of filtration openings to filter the liquid extraction to produce a beverage and a second surface for receiving the beverage from said filtration openings;

a body comprising a chamber impermeable to liquid for receiving said predetermined amount of flavor-containing materials and a hot liquid to form a dispersion therein, an upper opening to which said porous filter is attached to filter said dispersion, and a connector for connecting said body to the container in such a way that the container can be tilted to generate a liquid head to act on said first surface of said filter to drive the liquid extraction in said chamber through said filter at said upper opening of said body to said second surface as the beverage to be drunk or poured; and wherein said chamber is adapted to be sufficiently large to enable said dispersion of flavor-containing materials to move substantially freely but to be receivable in the container, and said chamber comprises an impermeable wall to prevent said dispersion from entering the space between the side wall of the container and said impermeable wall.

46. A device as defined in claim 45 further comprising an air space between the side wall of the container and said substantially impermeable wall of said impermeable chamber, thereby providing heat insulation for the container.

47. A device as defined in claim 45 further comprising a vent to provide communication between atmosphere and the space between said impermeable wall and the container to enable said impermeable wall to change in size or volume when the container is tilted to generate said liquid head to drive the liquid extraction in said chamber through said filter.

48. A device for brewing a beverage such as coffee, espresso, latte or mocha from a supply of flavor-containing materials comprising:
   a container comprising a bottom, a top opening, a side wall and a containing chamber defined by said side wall and bottom for receiving a supply of flavor-containing materials;
   a filter for dividing said containing chamber of said container into an exchange chamber in the upper part of said container and a sufficiently large extraction chamber in the lower part of said container, said filter comprising a first surface adapted to face said bottom of said container and to contact the supply of flavor-containing materials, a second surface facing said top opening of said container, and a plurality of filtration openings between said first and second surfaces;
   a connector for connecting said filter to said container in such a way that said container can be tilted to generate a liquid head to act on said first surface of said filter to drive the liquid extraction in said sufficiently large extraction chamber through said filtration openings as the beverage to said second surface of said filter and that said container can be moved according to a transfer-causing motion comprising at least one of swirling, vibrating and shaking motions to cause a rapid transfer of the flavors in said sufficiently large extraction chamber to said exchange chamber through said filtration openings;
   wherein said exchange chamber comprises at least the upper part of said side wall of said container and said second surface of said filter and enables a depth of liquid to form above said filter, thereby covering said filter at least before a drink or sip is taken from said container, said depth of liquid comprising little or substantially no flavors from said flavor-containing materials prior to said transfer-causing motion of said container;
   wherein said sufficiently large extraction chamber is comprised of a closed chamber formed between said bottom of said container and said first surface of said filter to enclose the supply of flavor-containing materials therein, said closed chamber being located below said exchange chamber and having a sufficiently large volume to form a substantially freely movable dispersion of the flavor-containing materials in hot liquid therein for the purpose of facilitating the extraction and transfer of the flavors in said closed chamber to the liquid in said exchange chamber during said transfer-causing motion of said container, thereby enabling said transfer-causing motion of said container to convert the liquid in said exchange chamber quickly to a reservoir of beverage full of flavors and ready to be drunk or poured in about 5 to 30 seconds.

49. A device as defined in claim 48 wherein at least part of said filter is sufficiently hydrophobic to enable air to pass through said filter substantially freely, thereby facilitating the brewing process.

50. A device as defined in claim 48 wherein said filter is adapted to change from convex to concave shape to increase the volume for said sufficiently large extraction chamber.

51. A device as defined in claim 48 wherein at least part of said filter is located so far above the bottom of said container that said sufficiently large extraction chamber has a volume that is approximately similar to or larger than the volume of said exchange chamber, thereby reducing the time to brew a cup of beverage.

52. A device as defined in claim 48 wherein said filter is connected to said side wall of said container in such a way that one end of said filter is substantially higher than the opposite side of said filter to make said filter substantially sloped, thereby facilitating the transfer of the flavors from said dispersion to the water in said sufficiently deep exchange chamber.

53. A device as defined in claim 48 wherein said filtration openings are sufficiently large and are adapted to be substantially straight-through openings, thereby causing a visually appealing layer of crema to form on the beverage in said sufficiently deep exchange chamber during said transfer-causing motion of said container.

54. A device as defined in claim 48 wherein said filter is connected to said side wall of said container near the middle part of said side wall.

55. A device as defined in claim 48 wherein said supply of flavor-containing materials comprises roasted coffee grounds and wherein said closed chamber has a volume approximately three or more times of the volume of the roasted coffee grounds to allow said dispersion to move substantially freely in said sufficiently large extraction chamber.

56. A device as defined in claim 48 wherein said filter is elastic or flexible, and wherein said connector and filter are adapted to enable said filter to change shape.

57. A device for brewing a beverage such as coffee, tea, espresso, latte or mocha comprising:
   a supply of flavor-containing materials adapted to be extracted by a hot liquid;
   a container having a bottom, a side wall, a top opening, and a containing chamber between said top opening and said bottom;
   a filter for dividing said containing chamber into an extraction chamber for enclosing said flavor-containing materials and an exchange chamber, said filter comprising a first surface adapted to contact said flavor-containing materials, a plurality of filtration openings adapted to allow liquid extraction to pass through while block all or substantially all solids and a second surface for receiving the beverage from said filtration openings;
   wherein said exchange chamber comprises said second surface of said filter and at least part of the side wail of said container, said exchange chamber being adapted to receive a depth of liquid above said second surface of said filter;
   wherein said filter is connected to said container in such a way that said container can be moved according to a transfer-causing motion comprising at least one of swirling, vibrating and shaking motions to cause the flavors to transfer from said extraction chamber to the depth of liquid in said exchange chamber, thereby quickly converting the depth of liquid to a reservoir of beverage ready for drinking from said exchange chamber; and wherein said extraction chamber comprises said first surface of said filter and a film to enclose said flavor-containing materials, said film being adapted to be received in said containing chamber and to be impermeable to prevent the liquid extraction in said extraction chamber from entering the space between the side wall of said container and said film, said film being further adapted to be sufficiently flexible to collapse when said container is tilted to produce a liquid head on said first surface of said filter to drive the liquid extraction out of said extraction chamber to said second surface of said filter into said exchange chamber.

58. A device for brewing a beverage such as coffee, espresso, latte or mocha from a supply of flavor-containing materials comprising:

a container comprising a bottom, a top opening, a side wall and a containing chamber defined by said side wall and bottom;

a filter for dividing said containing chamber into an exchange chamber and extraction chamber, said filter comprising a first surface adapted to contact the supply of flavor-containing materials, a plurality of filtration openings adapted to allow the liquid extraction in said extraction chamber to pass through as a beverage while block all or substantially all solids and a second surface for receiving the beverage from said filtration openings;

a connector for connecting said filter to said container in such a way that said container can be moved according to a transfer-causing motion comprising at least one of swirling, vibrating and shaking motions to cause the transfer of flavors from said extraction chamber to exchange chamber;

wherein said exchange chamber comprises said second surface of said filter and the side wall of said container to enable a depth of liquid to form therein and said extraction chamber is comprised of a closed chamber comprising at least said first surface of said filter to enclose the supply of flavor-containing materials therein; and wherein at least part of said closed chamber is located in the vicinity of said top opening of said container and at least some of said filtration openings on said closed chamber are adapted to enable the flavors of the flavor-containing materials enclosed by said closed chamber to transfer sufficiently rapidly to the liquid in said exchange chamber by said transfer-causing motion of said container without substantially collapsing or moving said closed chamber relative to said container, thereby converting the liquid in said exchange chamber to a beverage full of flavors ready for drinking in about 5 to 30 seconds.

* * * * *